(12) United States Patent
Holland

(10) Patent No.: US 9,825,822 B1
(45) Date of Patent: Nov. 21, 2017

(54) GROUP NETWORKING IN AN OVERLAY NETWORK

(71) Applicant: Amazon Technologies, Inc., Reno, NV (US)

(72) Inventor: Ryan Christopher Holland, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 287 days.

(21) Appl. No.: 14/180,278

(22) Filed: Feb. 13, 2014

(51) Int. Cl.
*G06F 15/16* (2006.01)
*G06F 15/177* (2006.01)
*G06F 15/173* (2006.01)
*H04L 12/24* (2006.01)
*H04L 12/46* (2006.01)

(52) U.S. Cl.
CPC .......... *H04L 41/50* (2013.01); *H04L 12/4641* (2013.01); *H04L 41/046* (2013.01)

(58) Field of Classification Search
CPC ............... H04L 12/4641; H04L 41/046; H04L 41/0806; H04L 41/0816; H04L 41/0823; H04L 41/12; H04L 67/1002; H04L 67/1008; G06Q 10/0639; G06F 9/5077; G06F 2009/45595; G06F 9/45558; G06F 9/4856
USPC ....... 709/201, 202, 203, 220, 221, 222, 223, 709/224
See application file for complete search history.

(56) References Cited

U.S. PATENT DOCUMENTS

| | | | | |
|---|---|---|---|---|
| 6,085,238 A * | 7/2000 | Yuasa | ................ | H04L 12/4641 370/409 |
| 6,507,863 B2 * | 1/2003 | Novaes | ............... | H04L 12/1877 709/201 |
| 6,735,626 B1 * | 5/2004 | Tezuka | .................... | H04L 12/24 370/396 |
| 2002/0165977 A1 * | 11/2002 | Novaes | ............... | H04L 12/1877 709/238 |
| 2004/0249911 A1 * | 12/2004 | Alkhatib | .............. | G06Q 10/109 709/223 |
| 2007/0043860 A1 * | 2/2007 | Pabari | ................... | G06F 9/5072 709/224 |
| 2007/0220121 A1 * | 9/2007 | Suwarna | ............... | G06F 9/4856 709/220 |
| 2008/0133723 A1 * | 6/2008 | Lee | ..................... | H04L 12/2814 709/222 |
| 2012/0036236 A1 * | 2/2012 | Richardson | ............. | H04L 12/66 709/220 |

(Continued)

OTHER PUBLICATIONS

Kevin Christopher Miller, U.S. Appl. No. 13/904,877, filed May 29, 2013, 50 pages.

*Primary Examiner* — Edward Kim
(74) *Attorney, Agent, or Firm* — Thorpe North & Western, LLP

(57) ABSTRACT

A technology to create and manage a group network in a virtual network is described. A network address may be registered as a member of a network group in an overlay network within a virtualized computing environment. An open connection may be maintained to the network address. Membership information may be sent over the open connection to the network address as membership of the network group changes. Membership information may be used in communicating with the network group using unicast transmissions.

20 Claims, 15 Drawing Sheets

(56) References Cited

U.S. PATENT DOCUMENTS

| | | | |
|---|---|---|---|
| 2012/0151053 A1* | 6/2012 | Kato | G06F 11/3409 709/224 |
| 2013/0117427 A1* | 5/2013 | Amano | G06F 9/4416 709/223 |

* cited by examiner

GROUP NETWORKING IN AN OVERLAY NETWORK

BACKGROUND

Virtualized computing is a way to reduce computing costs and/or provide a more robust computing environment. Using virtualized computing, a customer may be able to purchase computing resources for a given period of time, for example. Moreover, a virtualized computing service provider may provide a service level agreement (SLA) guaranteeing a certain level of reliability. While virtualized computing has been available for some time, virtualized computing service implementations have adjusted with changing technology. With the advent of the Internet, for instance, the access to computing resources over a network has given rise to the notion that computational power may become increasingly similar to a utility. In this way, more computationally intensive processing may take place somewhere in the network away from a client device, while the local processing on the client device may be simply rendering the results delivered over the network, for example.

In some virtualized computing environments, a virtual network is used to provide a logically isolated virtual network for a user. With overlay networking (e.g., virtual networking) the user can be given complete control over the virtual network, including selecting an IP address range, creation of subnets, configuration of route tables, etc. A virtual network is a virtualized computer network which is built on top of an underlying physical network and physical computing resources. Nodes in the overlay network are assigned virtual IP addresses and packets sent to and from the nodes are routed through one or more physical links in the underlying network.

Despite the usefulness of overlay networks, some applications on overlay networks may experience issues in using multicast and other similar communication protocols efficiently. Multicast and other similar communication protocols are often used to deliver data to multiple recipients in a network environment. In traditional multicast network environments, a sender may send packets of data to a network whereby various routers and/or gateways in the network may replicate the packets and subsequently deliver the data to various interested recipients. However, adequately addressing multicast issues in a virtual network may present additional costs to organizations that rely on multicast or other similar protocols in a virtualized computing environment.

DETAILED DESCRIPTION

Figure 1:
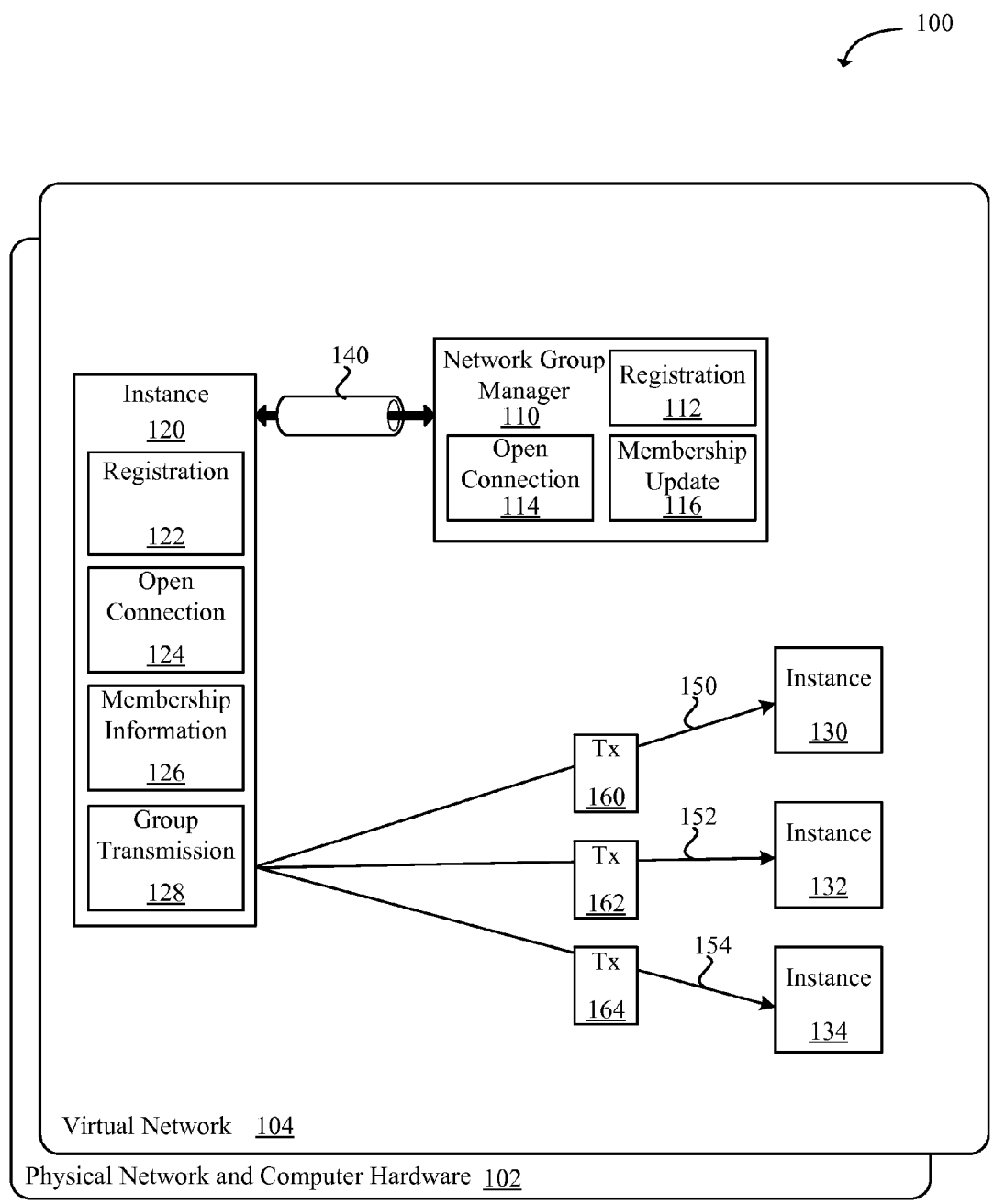
FIG. 1 illustrates an example use of a network group manager to create a multicast transmission on a virtual network using a plurality of unicast transmissions.

A networking technology is described that may allow efficient group networking in a virtual network overlaid on a physical network substrate. The network technology may, in particular, be used for managing and participating in a network group within a virtual network.

For instance, a service provider may provide a virtual network that customers can use for a fee. A customer may use the virtual computing environment to create a computer cluster of virtualized computing instances to process a large dataset. As an illustrative example, the computer cluster may simulate air-fluids for designing more fuel efficient airplanes.

The computer cluster may be part of a network group. A network group may have some functionality similar to a multicast group. In multicasting, a message may be transmitted from a source node to a multicast group. For example, multicasting may be performed by sending a single transmission from a source node. The network then replicates the transmission within the network as the transmission traverses the network en route to members of the multicast group. The topology of a network may dictate where the multicast transmission is to be replicated while traversing the network.

In a network group, however, communications between members of the network group may be through unicast transmissions. This may alleviate issues commonly found in implementing multicasting in a virtual network while still providing a mechanism for a member instance to contemporaneously communicate (e.g., nearly simultaneously communicate) with a group of member instances on the virtual network.

In an example embodiment, a network group manager may be used to provide an interface to create and maintain network groups and update current members within a network group. The network group manager may allow for the creation and deletion of network groups. Additionally, the network group manager may allow virtualized computing instances (i.e., member instances) to register (i.e., join) and/or deregister (i.e., leave) network groups.

In an example embodiment, the network group manager and a virtualized computing instance may create and maintain an open connection between one another. Using the open connection, membership information for a network group may be pushed down to the virtualized computing instance as membership of the network group changes. The virtualized computing instance may maintain membership information for the network group locally. For instance, the virtualized computing instance may create a table that lists current members of the network group. As a member instance is added to the network group (e.g. the member instance registers as a member of the network group), the network group manager may push down a network address for the member instance and the virtualized computing instance may receive information about the additional member instance and add the network address to the table. Similarly, when a member instance is removed from the network group (e.g. the member instance deregisters as a member of the network group), the network group manager may push down a network address for the member instance and the virtualized computing instance may remove the network address from the table.

If a virtualized computing instance, as a member of a network group, would like to communicate with the network group as a whole, the virtualized computing instance may send unicast transmissions to each network address in the table.

As a hypothetical example, a computer cluster may process stock market ticker data and digitized news stories from the Internet. A master node in the computer cluster may receive live stock market data, perform some preliminary processing and then may communicate the live stock market data to nodes within the computer cluster. In particular, the computer cluster may comprise a plurality of member instances with network addresses acting as nodes to provide processing within the computer cluster. The plurality of member instances may be registered as members of a network group and the master node may communicate the live stock market data to the nodes using the network group. As an outcome, the computer cluster may find a correlation between negativity in news stories and bear stock markets such that the a stock broker may be able to predict an approaching bear stock market by tracking negativity in news stories. Thus, in this example, the stock broker may be able to advise clients to change investment strategies prior to a potential onset of a bear stock market.

To more clearly describe the technology, examples are now provided with reference to the figures. Accordingly, FIG. 1 illustrates an example use of a network group manager 110 on an environment 100 to effect a multicast transmission in a virtual network 104 using a plurality of unicast transmissions 160, 162, 164 (labeled "Tx" to indicate a transmission). In the environment 100, a physical network and computer hardware 102 may provide the underlying infrastructure that is used to support, possibly among other things, a collection of virtualized computing instances 120, 130, 132, 134. Accordingly, the physical network and computer hardware 102 may include a collection of computing resources that are collectively configured to implement one or more virtual networks 104 that overlay the physical network and computer hardware 102. The physical network and computer hardware 102 may include, for example, server racks, server computing devices, routers, switches, and/or other devices, such as power supplies, battery backup devices, cooling devices and/or other devices. These devices may be located in different locations depending on the organization of the virtual computing system service and its customers. Alternatively, these devices may be located within the same data center or data center room. For more details on example techniques for operating virtual networks see FIGS. 2A-C and 3A-B and the accompanying description.

As illustrated in FIG. 1, the environment 100 may include a virtual network overlaid on a physical network substrate 104 implemented using the physical network and computer hardware 102. The virtual network 104 may include a plurality of participant devices operating as network member instances 120, 130, 132, 134 in the network. For instance, in this illustrative example, the virtual network 104 includes a network group manager 110 that may establish and maintain an open connection 140 on the virtual network 104. The virtual network 104 may provide a logical mechanism to communicate packets from a network member instance to another network member instance in the virtual network 104. In an example, some or all of the network member instances 120, 130, 132, 134 may be implemented as virtualized computing instances operating on one or more physical hosts (e.g., hardware devices) of the physical network and computer hardware 102. For example, a customer may utilize a virtualized computing instance 120 to transmit a data package to other virtualized computing instances 130, 132, 134 in the virtual network 104. Specifically, a customer may be an organization that utilizes the virtual computer system service to transmit data packages as part of its business. Additionally, the interested users may also be organizations or individuals that utilize the virtual computer system service to interact with other organizations.

It should be noted, however, that, while the term virtualized computing instances (e.g., virtual machines) is used throughout for the purpose of illustration of particular examples, the techniques described herein are applicable in other circumstances, such as networks in which one or more or even all the network member instances are not virtualized. Further, in an example, the packets may be Internet Protocol (IP) packets. However, while IP packets are used throughout for the purpose of illustration, the techniques herein are applicable to other communication protocols which may not necessarily utilize IP or other data packets, such as the IPX/SPX protocol or the NETBEUI (NetBios Extended User Interface) protocol.

In an example, the virtualized computing instance 120 may register as a member of a network group on the virtual network 104 by registering a network address of the virtualized computing instance 120 with a registration module 112 of the network group manager 110. The network address may, for example, be a virtualized or actual IP address for the virtualized computing instance 120. In one example, the virtual network 104 may be part of a virtualized computing environment and the virtualized computing instances 130, 132 134 may be members of the network group. Thus, upon the virtualized computing instance 120 registering as a member of the network group, the network group may include the multiple virtualized computing instances 120, 130, 132, 134.

A registration module 122 on the virtualized computing instance 120 may communicate with a registration module 112 on the network group manager 110. A network group identifier may be communicated over the open connection 140 to establish which network group the virtualized computing instance 120 may be seeking to join (i.e. registering as a member of the network group). In the scenario where a new network group is being created, the network group manager 110 may incrementally or randomly assign a network group identifier and communicate the new network group identifier back to the virtualized computing instance 120. Alternatively, the virtualized computing instance 120 may generate a network group identifier and communicate the network group identifier to the network group manager 110.

The virtualized computing instance 120 may receive membership information for the network group intermittently over the open connection 140 including a plurality of network addresses for current members of the network group. Therefore, in the illustrated example, the virtualized computing instance 120 may receive the respective network addresses (e.g. IP addresses) for the virtualized computing instances 130, 132, 134 already in the network group. The virtualized computing instance 120 may use the received membership information to maintain the plurality of network addresses. For instance, the virtualized computing instance 120 may keep an updated table of current member addresses of the network group. A membership information module 126 on the virtualized computing instance 120 may communicate with a membership update module 116 on the network group manager 110. As membership of the network group changes, the membership update module 116 may push down, for instance, membership information over one or more open connections (e.g. the open connection 140 to the virtualized computing instance 120). In this way, members of the network group may be able to locally maintain a plurality of network addresses of members of the network group.

The open connection 140 between the virtualized computing instance 120 and the network group manager 110 may be maintained over time. In particular, the open connection 140 may be kept open such that the network group manager 110 may be able to push down membership changes to members of the network group using long-polling. Accordingly, most or all of the members of a network group may maintain an open connection with the network group manager 110. In particular, open connection modules 124, 114 on the virtualized computing instance 120 and the network group manager 110, respectively, may communicate to maintain the open connection 140. One example implementation, the open connection 140, visualized as a tube, may be made using the transmission control protocol (TCP) and sending periodic keepalive messages across the open connection 140. In some cases, an open connection may not be used. Indeed, in some scenarios where network transit costs are very high maintaining an open connection may cost prohibitive or at least wasteful. In these scenarios, a connection may be made at periodic intervals or as changes in membership information necessitate.

To effect a multicast transmission, membership information maintained by the membership information module 126 may be used to send the unicast transmissions 160, 162, 164 to a plurality of network addresses. In particular, the unicast transmission 160 may be communicated over a path 150 on the virtual network 104. Likewise, the unicast transmissions 162, 164 may be communicated over a path 152 and a path 154, respectively, to the virtualized computing instances 132, 134. A group transmission module 128 may be used to effectuate the unicast transmissions 160, 162, 164 to the network group. Modules and associated functionality found within the virtualized computing instance 120 may likewise be found on other virtualized computing instances in the environment 100 (e.g. virtualized computing instances 130, 132, 134). In this way, members of a network group may possess functionality to communicate amongst themselves as a network group and be able to communicate with the network group manager 110.

Each of the virtualized computing instances 130, 132, 134 may receive and process the unicast transmissions 160, 162, 164 respectively. As discussed in more detail below, the virtual network 104 may be dynamic. For instance, a network topology of the virtual network 104 may change over time to include additional network member instances, fewer network member instances, to change connectivity among member instances and/or in other ways. More particularly, membership of a network group may change over time. The virtualized computing instance 134, for instance, may leave the network group by deregistering as a member of the network group. To deregister, the virtualized computing instance 134 may notify the registration module 112 of the network group manager 110. Once the registration module 112 has received this deregistration information, then the updated registration information for the group can be pushed out the virtualized computing instances 120, 130, 132 that are still remaining in the group. In such an instance, transmissions to the network group as a whole may not include a transmission to the virtualized computing instance 134. As discussed below, the technology may allow for efficient and effective techniques for communicating to a network group.

Figure 2:
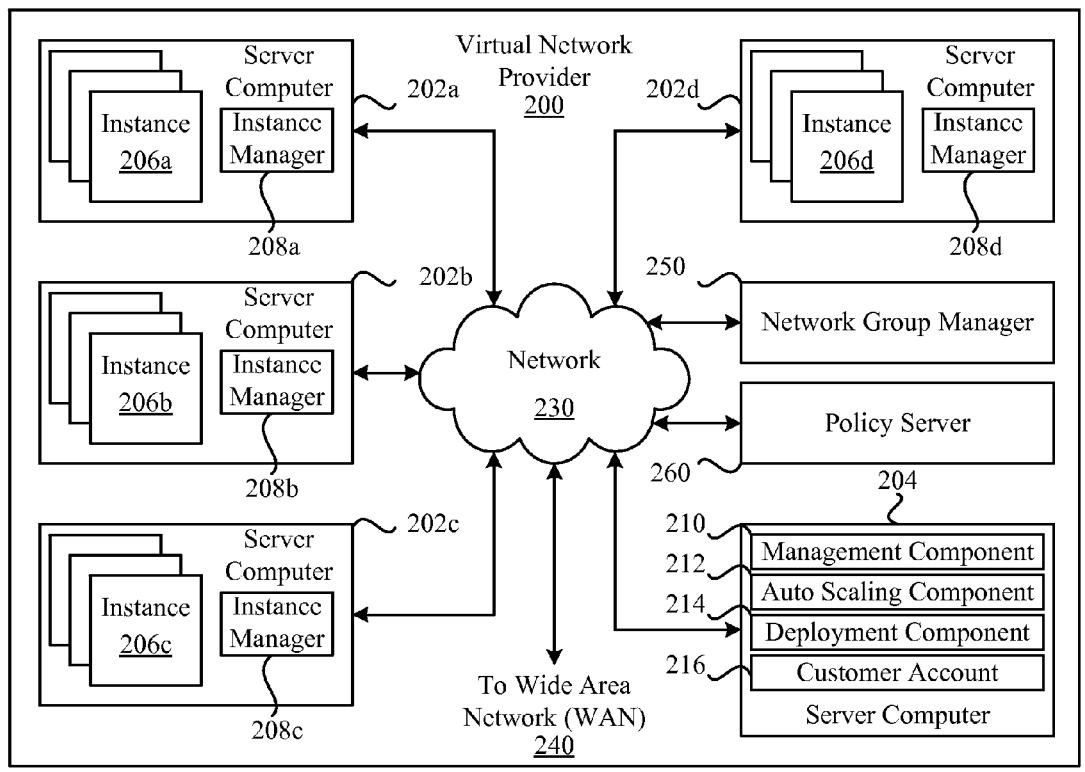
FIG. 2 illustrates an example of a virtualized computing resource provider with a network group manager.

FIG. 2 illustrates an example of a virtualized computing resource provider with a network group manager 250. In particular, a network-based virtual network provider 200 is depicted that illustrates one environment in which the technology described herein may be used. More particularly, the virtual network provider 200 may provide a virtual network as discussed with reference to FIG. 1. Several issues may affect the implementation of multicast in larger networks such as the virtual network provider 200. In many conventional multicast networks, all routers in the network must be part of the same administrative domain, thereby making configuration of a large multicast network difficult. This issue, along with others, may be problematic in a virtual network where nodes within the virtual network may not be physically or communicatively proximate to one another. A large amount of communication may need to take place on the underlying network, for example, to create a common administrative domain. Additionally, in a dynamically changing environment, there may be difficulties in administering a virtual multicast network since participants may often be changing configurations. The virtual network provider 200 may be used to form the virtual network 104 referenced in FIG. 1. In addition, using the technology with the virtual network provider 200 may allow for efficient group networking in a virtual network.

The virtual network provider 200 (e.g., the cloud provider) is capable of delivery of computing and storage capacity as a service to a community of end recipients. In one example, the virtual network provider can be established for an organization by or on behalf of the organization. That is, the virtual network provider 200 may offer a "private cloud environment." In another example, the virtual network provider 200 supports a multi-tenant environment, wherein a plurality of customers operate independently (i.e., a public cloud environment). Generally speaking, the virtual network provider 200 can provide the following models: Infrastructure as a Service ("IaaS"), Platform as a Service ("PaaS"), and/or Software as a Service ("SaaS"). Other models can be provided. For the IaaS model, the virtual network provider 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the virtual network provider platform without the cost of buying and managing the underlying hardware and software. The SaaS model allows installation and operation of application software in the virtual network provider. End users may access the virtual network provider 200 using networked client devices, such as desktop computers, laptops, tablets, smartphones, etc running web browsers or other lightweight client applications, for example. Those skilled in the art will recognize that the virtual network provider 200 can be described as a "cloud" environment.

The virtual network provider 200 includes a plurality of server computers 202a-d. While only four server computers are shown, any number can be used, and large centers can include thousands of server computers. The server computers 202a-d can provide computing resources for executing software instances 206a-d. Instances 206a-d may, for example, be virtual machines. As known in the art, a virtual machine is an instance of a software implementation of a machine (i.e. a computer) that executes applications like a physical machine. In the example of virtual machine, each of the server computers 202a-d can be configured to execute an instance manager 208a-d capable of executing the instances. The instance manager 208a-d can be a hypervisor or another type of program configured to enable the execution of multiple instances 206a-d on a single server. Additionally, each of the instances 206a-d can be configured to execute one or more applications. The instances 206a-d are examples of virtualized computing instances, and a subset of the instances 206a-d may be members of one or more network groups.

It should be appreciated that although the discussion herein is primarily in the context of virtual machines, other types of instances can be utilized with the concepts and technologies disclosed herein. For instance, the technologies disclosed herein can be utilized with storage resources, data communications resources, and with other types of computing resources. The technology might also execute all or a portion of an application directly on a computer system without utilizing virtualized computing instances.

One or more server computers 204 can be reserved for executing software components for managing the operation of the server computers 202 and the instances 206a-d. For example, a server computer 204 can execute a management component 210. A customer can access the management component 210 to configure various aspects of the operation of the instances 206a-d purchased by the customer. For example, the customer can purchase, rent or lease instances and make changes to the configuration of the instances. The customer can also specify settings regarding how the purchased instances are to be scaled in response to demand. An auto scaling component 212 can scale the instances 206a-d based upon rules defined by the customer. The auto scaling component 212 may allow a customer to specify scale-up rules for use in determining when new instances should be instantiated, and scale-down rules for use in determining when existing instances should be terminated, for example. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist customers in the deployment of new instances 206a-d of computing resources. The deployment component can have access to account information associated with the instances, such as who is the owner of the account, credit card information, country of the owner, etc. The deployment component 214 can receive a configuration from a customer that includes data describing how new instances 206a-d may be configured. For example, the configuration can specify one or more applications to be installed in new instances 206a-d, provide scripts and/or other types of code to be executed for configuring new instances 206a-d, provide cache logic specifying how an application cache should be prepared, and other types of information. The deployment component 214 can utilize the customer-provided configuration and cache logic to configure, prime, and launch new instances 206a-d. The configuration, cache logic, and other information may be specified by a customer using the management component 210 or by providing this information directly to the deployment component 214.

Customer account information 216 can include any desired information associated with a customer of the multi-tenant environment. For example, the customer account information may include a unique identifier for a customer, a customer address, billing information, licensing information, customization parameters for launching instances, scheduling information, auto-scaling parameters, etc. As described above, the customer account information 216 may also include security information used in encryption of asynchronous responses to API requests. By "asynchronous" it is meant that the API response can be made at any time after the initial request and with a different network connection.

A network 230 can be utilized to interconnect the server computers 202a-d and the server computers 204, 250. The network 230 can be a local area network (LAN) and can be connected to a Wide Area Network (WAN) 240 so that end users can access the virtual network provider 200. As discussed in greater detail below with reference to FIG. 9, the WAN 240 may be used by a virtual private network (VPN) access point (AP) to provide access to an external member instance to a virtual network overlaid on a physical network substrate within the virtual network provider 200. It should be appreciated that the network topology illustrated in FIG. 2 has been simplified and that many more networks and networking devices can be utilized to interconnect the various computing systems disclosed herein. More particularly, the network 230 may implement a physical network on which a virtual network may be based.

A network group manager 250 is shown that may be used to manage network groups within the virtual network provider. The network group manager 250 may also be configured to respond to interface requests asynchronously and push down membership information to members of a network group. In this way, the network group manager 250 may manage network group information and send current membership address information to members of the network group for use in communicating with the network group using unicast transmissions to effect a multicast transmission. In one example, the network group manager 250 may be a virtualized computing instance, or alternatively, may run directly on top of physical server hardware. The network group manager 250 may provide functionality though various interface types. The network group manager may provide programmatic interface, such as an interface to receive remote procedure calls (RPC), a representational state transfer (REST) interface or a proprietary network interface for communication and access of virtualized functions, as a couple of non-limiting examples.

A policy server 260 may be included within the virtual network provider 200 to authorize users of the virtual network provider and enforce policies created and stored within the policy server 260. As an example, the policy server 260 may be used by the network group manager 250 to limit virtualized machine instances 260 from joining a network group (e.g. registering as a member of the network group). Further, the network group manager 250 may validate a credential of a virtualized computing instance 206a-d attempting to register as a member of a network group. Additionally, the network group manager 250 may limit access to current membership information of the network group based in part on the credentials of a virtualized computing instance 206a-d requesting the network group membership information and a network policy comprising a stored set of permissions associated with a set of credentials. Thus, the policy server 260 may authenticate requests to join network groups by comparing credentials with a stored set of credentials, and may also grant or deny access to services on the network. The policy server 260, for example, may enforce a policy of denying a specific virtualized computing instance from registering the virtualized computing instance as a member of any group.

Figure 3A:
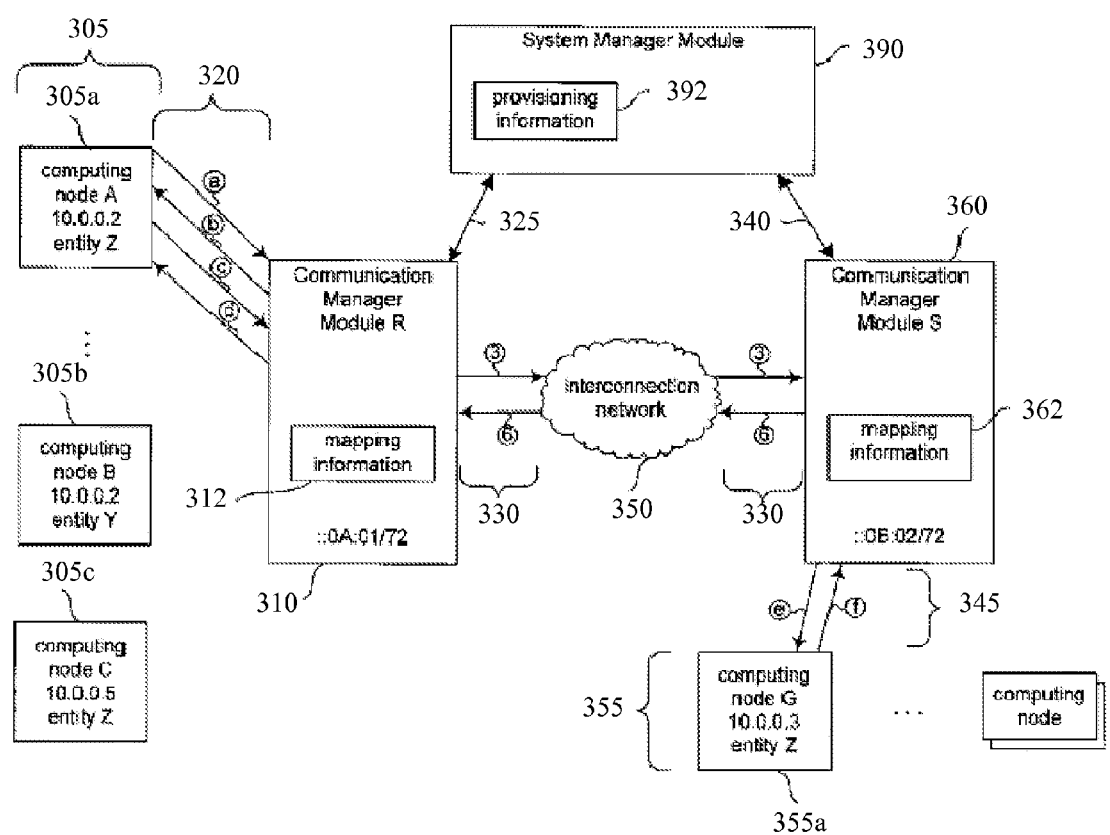
FIGS. 3A and 3B illustrate examples of managing communications between computing nodes that occur via a virtual network.
Figure 3B:
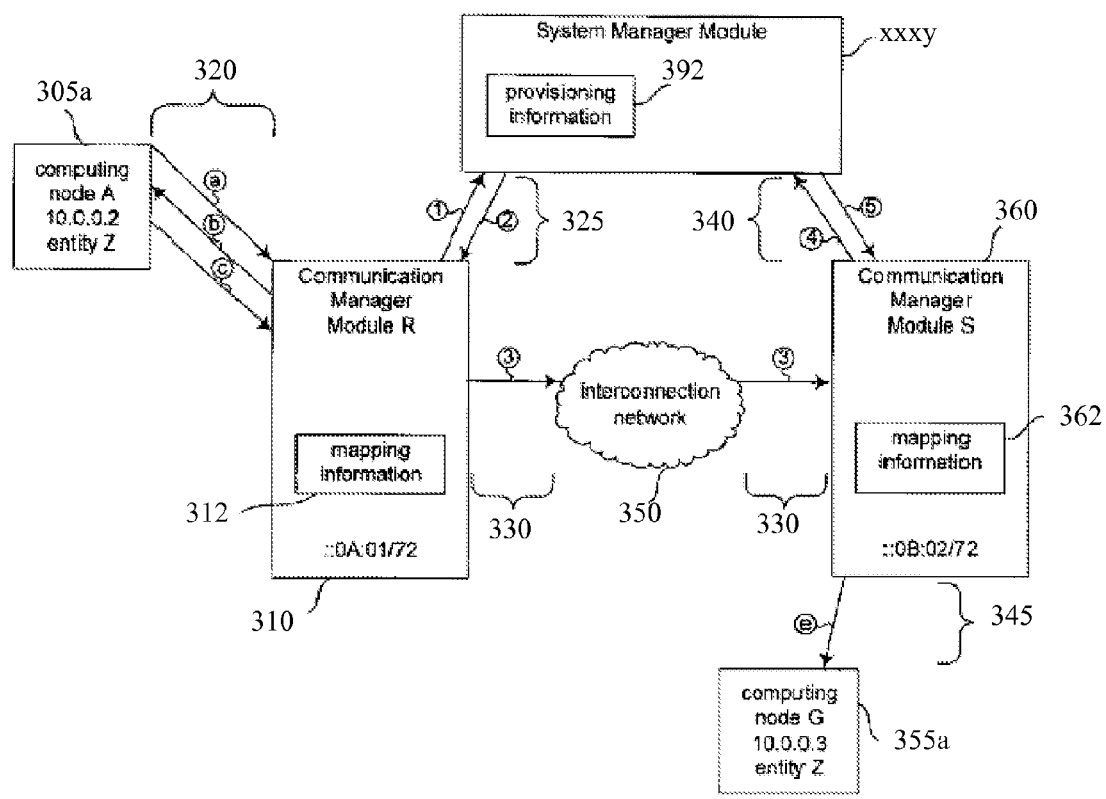

FIGS. 3A and 3B illustrate further examples with additional illustrative details related to managing communications between computing nodes that occur via a virtual network overlaid on one or more physical networks. In particular, FIG. 3A illustrates various example computing nodes 305 and 355 that may communicate with each other over one or more intermediate interconnection networks 350. Computing nodes may also be known as virtualized computing instances, virtual computing instances or virtual machines. In this example embodiment, the computing nodes are operated on behalf of multiple distinct entities, such as multiple customers of a program execution service, and a system manager module 390 manages the association of particular computing nodes with particular entities and virtual networks. The example computing nodes of FIG. 3A include three computing nodes executed on behalf of an example entity Z, those being computing nodes 305a, 305c and 355a. In addition, other computing nodes are operated on behalf of other entities, such as computing node 305b.

In this example, the computing nodes 305 are managed by an associated Communication Manager module R 310, and the computing nodes 355 are managed by an associated Communication Manager module S 360. As one example, computing nodes 305 may each be one of multiple virtual machines hosted by a single physical computing system, and Communication Manager module R may be part of a hypervisor or virtual machine monitor for that physical computing system. For example, with reference to FIG. 3, computing nodes 305 could represent the virtual machines 206a, and computing nodes 355 could represent the virtual machines 206d.

Each of the Communication Manager modules of FIG. 3A are associated with a sub-network of multiple physical network addresses, which the Communication Manager modules manage on behalf of their associated computing nodes. For example, Communication Manager module R is shown to be associated with the IPv6 network address range of "::0A:01/72", which corresponds to the 128-bit addresses (in hexadecimal) from XXXX:XXXX:XXXX:XXXA:0100: 0000:0000:0000 to XXXX:XXXX:XXXX:XXXA:01FF: FFFF:FFFF:FFFF (representing 2 to the power of 56 unique IPv6 addresses), where each "X" may represent any hexadecimal character that is appropriate for a particular situation (e.g., with the initial 64 bits corresponding a particular organization and network topology, as discussed in greater detail with respect to FIG. 3C). The interconnection network 350 will forward any communication with a destination network address in that range to Communication Manager module R—thus, with the initial 72 bits of the range specified, the Communication Manager module R may use the remaining available 56 bits to represent the computing nodes that the Communication Manager module R manages and to determine how to process incoming communications whose destination network addresses are in that range.

For purposes of the example shown in FIG. 3A, computing nodes 305a, 305c and 355a are part of a single virtual local network for entity Z, and have assigned IPv4 network addresses of "10.0.0.2", "10.0.0.5" and "10.0.0.3", respectively (if written in dotted hexadecimal form, "10.0.0.2" would instead be "A.0.0.2"). Because computing node 305b is part of a distinct virtual network for entity Y, it can share the same virtual network address as computing node 305a without confusion. In this example, computing node A 305a wants to communicate with computing node G 355a, which it believes is part of a common local physical network with computing node A, as the interconnection network 350 and Communication Manager modules are transparent to computing nodes A and G in this example. In particular, despite the physical separation of computing nodes A and G, the Communication Manager modules 310 and 360 operate so as to overlay the virtual local network for entity Z over the physical interconnection network 350 for communications between those computing nodes, so that the lack of an actual local network is transparent to the computing nodes A and G. In this example, the physical interconnection network 350 is an IPv6 substrate network on which IPv4 virtual networks are overlaid.

In order to send the communication to computing node G, computing node A exchanges various messages 320 with Communication Manager module R 310, despite in the illustrated embodiment being unaware of the existence of Communication Manager module R (i.e., may believe that it is transmitting a broadcast message to all other computing nodes on the local network). In particular, in this example, computing node A first sends an ARP message request 320-a that includes the local network address for computing node G (i.e., "10.0.0.3") and that requests the corresponding hardware address for computing node G (e.g., a 48-bit MAC, or Media Access Control, address). Communication Manager module R intercepts the ARP request 320-a, and responds to computing node A with a spoofed ARP response message 320-b that includes a dummy virtual hardware address for computing node G.

To obtain the dummy virtual hardware address for the response message, the Communication Manager module R first checks a local store 312 of information that maps dummy virtual hardware addresses to corresponding IPv6 actual physical network addresses, with each of the dummy virtual hardware addresses corresponding to an IPv4 virtual network address for a particular entity's virtual network. If the local store 312 does not contain an entry for computing node G (e.g., if none of the computing nodes 305 have previously communicated with computing node G, if a prior entry in local store 312 for computing node G has expired, etc.), the Communication Manager module R interacts 325 with system manager module 390 to obtain the corresponding actual IPv6 physical network address for computing node G on behalf of computing node A. In particular, in this example, the system manager module 390 maintains provisioning information 392 that identifies where each computing node is actually located and to which entity and/or virtual network the computing node belongs, such as by initiating execution of programs on computing nodes for entities and virtual networks or by otherwise obtaining such provisioning information. As discussed in greater detail with respect to FIG. 3B, the system manager module 390 determines whether the request from Communication Manager module R 310 on behalf of computing node A for computing node G's actual IPv6 physical network address is valid, including whether computing node A is authorized to communicate with computing node G, and if so provides that actual IPv6 physical network address.

Communication Manager module R receives the actual IPv6 physical network address for computing node G from the system manager module 390, and stores this received information as part of a new entry for computing node G 355a as part of mapping information 312 for later use (optionally with an expiration time and/or other information). In addition, Communication Manager module R determines a dummy virtual hardware address to be used for computing node G (e.g., by generating an identifier that is locally unique for the computing nodes managed by Communication Manager module R), stores that dummy virtual hardware address in conjunction with the received actual IPv6 physical network address as part of the new mapping information entry, and provides the dummy virtual hardware address to computing node A as part of response message 320-b. By maintaining such mapping information 312, later communications from computing node A to computing node G may be authorized by Communication Manager module R without further interactions with the system manager module 390, based on the use of the dummy virtual hardware address previously provided by Communication Manager module R.

In other embodiments, Communication Manager module R may interact with system manager module 390 to obtain a physical network address for computing node G or otherwise determine such a physical network address at times other than upon receiving an ARP request, such as in response to any received communication that is directed to computing node G using the virtual network address for entity Z's virtual network. Furthermore, in other embodiments the virtual hardware addresses that are used may differ from this example, such as if the virtual hardware addresses are specified by the system manager module 390, if the virtual hardware addresses are not random and instead store one or more types of information specific to the corresponding computing nodes, etc. In addition, in this example, if computing node A had not been determined to be authorized to send communications to computing node G, whether by the system manager module 390 and/or Communication Manager module R, Communication Manager module R would not send the response message 320-b with the dummy virtual hardware address (e.g., will send no response, will send an error message response, etc.).

In this example, the returned IPv6 actual physical network address corresponding to computing node G in response message 325-2 is "::0B:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the virtual local network for entity Z (e.g., as previously assigned by the system manager module to that network to reflect a random number or some other number corresponding to the entity). The initial 72 bits of the IPv6 network address store the "::0B:02" designation, corresponding to the sub-network or other portion of the interconnection network with a network address range of "::0B:02/72" to which Communication Manager module S corresponds— thus, a communication sent over the interconnection network 350 to IPv6 destination network address "::0B:02:<Z-identifier>:10.0.0.3" will be routed to Communication Manager module S. In other embodiments, the entity network identifier may be other lengths (e.g., 32 bits, if Communication Manager module S has a sub-network with a network address range of 64 bits rather than 56 bits) and/or may have other forms (e.g., may be random, may store various types of information, etc.), and the remaining 56 bits used for the network address range of the sub-network may store other types of information (e.g., an identifier for a particular entity, a tag or label for the virtual network, etc.). Additional details related to an example configured IPv6 actual physical network address for use with an overlay network are described with respect to FIG. 3C.

After receiving the response message 320-b from Communication Manager module R, computing node A creates and initiates the sending of a communication to computing node G, shown in FIG. 3A as communication 320-c. In particular, the header of communication 320-c includes a destination network address for destination computing node G that is "10.0.0.3", a destination hardware address for destination computing node G that is the dummy virtual hardware address provided to computing node A in message 320-b, a source network address for sending computing node A that is "10.0.0.2", and a source hardware address for sending computing node A that is an actual or dummy hardware address that was previously identified to computing node A.

Communication Manager module R intercepts the communication 320-c, modifies the communication as appropriate, and forwards the modified communication over the interconnection network 350 to computing node G. In particular, Communication Manager module R extracts the virtual destination network address and virtual destination hardware address for computing node G from the header, and then retrieves the IPv6 actual physical network address corresponding to that virtual destination hardware address from mapping information 312. As previously noted, the IPv6 actual physical network address in this example is "::0B:02:<Z-identifier>:10.0.0.3", and Communication Manager module R creates a new IPv6 header that includes that actual physical network address as the destination address. Similarly, the Communication Manager module R extracts the virtual source network address and virtual source hardware address for computing node A from the header of the received communication, obtains an IPv6 actual physical network address corresponding to that virtual source hardware address (e.g., from a stored entry in mapping information 312, by interacting with the system manager module 390 to obtain that information if not previously obtained, etc.), and includes that actual physical network address as the source network address for the new IPv6 header. In this example, the IPv6 actual physical network address for computing node A is "::0A:01:<Z-identifier>:10.0.0.2", which if used in a reply by Communication Manager module S on behalf of computing node G will be routed to Communication Manager module R for forwarding to computing node A. The Communication Manager module R then creates a new communication 330-3 by modifying communication 320-c so as to replace the prior IPv4 header with the new IPv6 header (e.g., in accordance with SIIT), including populating the new IPv6 header with other information as appropriate for the new communication (e.g., payload length, traffic class packet priority, etc.). Thus, the new communication 330-3 includes the same content or payload as prior communication 320-c, without encapsulating the prior communication 320-c within the new communication 330-3. Furthermore, access to the specific information within the payload is not needed for such re-headering, such as to allow Communication Manager module R to handle communications in which the payload is encrypted without needing to decrypt that payload.

In at least some embodiments, before forwarding communication 330-3 to Communication Manager module S, Communication Manager module R may perform one or more actions to determine that communication 320-*c* is authorized to be forwarded to computing node G as communication 330-3, such as based on the mapping information 312 including a valid entry for the source and/or destination virtual hardware address used in communication 320-*c*. In other embodiments, such an authorization determination may not be performed by Communication Manager module R for each outgoing communication, or instead may be performed in other manners (e.g., based on a determination that the sending node and destination node are part of the same virtual network or are associated with the same entity or are otherwise authorized to inter-communicate, based on an interaction with system manager module 390 to obtain an authorization determination for the communication, etc.).

After Communication Manager module R forwards the modified communication 330-3 to the interconnection network 350, the interconnection network uses the physical IPv6 destination network address of the communication to route the communication to Communication Manager module S. In doing so, the devices of the interconnection network 350 do not use the portion of the destination network address that includes the embedded entity network identifier or embedded virtual network address, and thus do not need any special configuration to forward such a communication, nor even awareness that a virtual network is being overlaid on the physical interconnection network.

When Communication Manager module S receives communication 330-3 via the interconnection network 350, it performs actions similar to those of Communication Manager module R, but in reverse. In particular, in at least some embodiments, the Communication Manager module S verifies that communication 330-3 is legitimate and authorized to be forwarded to computing node G, such as via one or more interactions 340 with the system manager module. If the communication is determined to be authorized (or if the authorization determination is not performed), the Communication Manager module S then modifies communication 330-3 as appropriate and forwards the modified communication to computing node G. Additional details related to the verification of the communication 330-3 are discussed with respect to FIG. 3B.

In particular, to modify communication 330-3, Communication Manager module S retrieves information from mapping information 362 that corresponds to computing node G, including the virtual hardware address used by computing node G (or generates such a virtual hardware address if not previously available, such as for a new computing node). Communication Manager module S then creates a new communication 345-*e* by modifying communication 330-3 so as to replace the prior IPv6 header with a new IPv4 header (e.g., in accordance with SIIT). The new IPv4 header includes the virtual network address and virtual hardware address for computing node G as the destination network address and destination hardware address for the new IPv4 header, the virtual network address and a dummy virtual hardware address for computing node A as the source network address and source hardware address for the new IPv4 header, and includes other information as appropriate for the new communication (e.g., total length, header checksum, etc.). The dummy virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 355 for computing node A's hardware address). Thus, the new communication 345-*e* includes the same content or payload as prior communication 320-*c* and 330-3. Communication Manager module S then forwards new communication 345-*e* to computing node G.

After receiving communication 345-*e*, computing node G determines to send a response communication 345-*f* to computing node A, using the source virtual network address and source virtual hardware address for computing node A from communication 345-*e*. Communication Manager module S receives communication 345-*e*, and processes it in a manner similar to that previously described with respect to communication 320-*c* and Communication Manager module R. In particular, Communication Manager module S optionally verifies that computing node G is authorized to send communications to computing node A, and then modifies communication 345-*f* to create communication 330-6 by generating a new IPv6 header using mapping information 362. After forwarding communication 330-6 to the interconnection network 350, the communication is sent to Communication Manager module R, which processes the incoming communication in a manner similar to that previously described with respect to communication 330-3 and Communication Manager module S. In particular, Communication Manager module R optionally verifies that computing node G is authorized to send communications to computing node A and that communication 330-6 actually was sent by computing node G, and then modifies communication 330-6 to create communication 320-*d* by generating a new IPv4 header using mapping information 312. Communication Manager module R then forwards communication 320-*d* to computing node A.

In this manner, computing nodes A and G may inter-communicate using a IPv4-based virtual local network, without any special configuration of those computing nodes to handle the actual intervening IPv6-based substrate interconnection network, and interconnection network 350 may forward IPv6 communications without any special configuration of any networking devices of the interconnection network, based on the Communication Manager modules overlaying the virtual local network over the actual physical interconnection network without encapsulation of communications and on using embedded virtual network addresses in the substrate physical network addresses.

In addition, while not illustrated with respect to FIG. 3A, in at least some embodiments the Communication Manager modules may receive and handle other types of requests and communications on behalf of associated computing nodes. For example, Communication Manager modules may take various actions to support broadcast and multicast capabilities for computing nodes that they manage. As one example, in some embodiments, a special multicast group virtual network address suffix may be reserved from each entity network identifier prefix for use in signaling Layer-2 raw encapsulated communications. Similarly, for link-local broadcast and multicast communications, a special multicast group/64 prefix may be reserved (e.g., "FF36:0000::"), while a different destination address prefix (e.g., "FF15:0000::") may be used for other multicast communications. Thus, for example, multicast and broadcast IP frames may be encapsulated using a corresponding reserved 64-bit prefix for the first 64 bits of the 128-bit IPv6 address, with the remaining 64 bits including the virtual IPv4 network address for the destination computing node and the entity network identifier for the destination computing node in a manner similar to that previously described. Alternatively, in other embodiments, one or more types of broadcast and/or multicast communications may each have a corresponding reserved label or other identifier that has a different value or form, including using a different number of bits and/or being stored in a manner other than as a network address prefix. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier.

In addition, it will be appreciated that a Communication Manager module may facilitate communications between multiple of the computing nodes that are associated with that Communication Manager module. For example, with respect to FIG. 3A, computing node 305a may wish to send an additional communication (not shown) to computing node 305c. If so, Communication Manager module R would perform actions similar to those previously described with respect to the handling of outgoing communication 320-c by Communication Manager module R and the handling of incoming communication 330-3 by Communication Manager module S, but without re-headering of the additional communication to use an IPv6 header since the communication will not travel over the interconnection network.

While not illustrated with respect to FIG. 3A, in at least some embodiments other types of requests and communications may also be handled in various ways. For example, in at least some embodiments, an entity may have one or more computing nodes that are managed by Communication Manager module(s) and that are part of a virtual network for that entity, and may further have one or more other non-managed computing systems (e.g., computing systems that are directly connected to the interconnection network 350 and/or that natively use IPv6 network addressing) that do not have an associated Communication Manager module that manages their communications. If the entity desires that those non-managed computing systems be part of that virtual network or otherwise communicate with the managed computing nodes of the virtual network, such communications between managed computing nodes and non-managed computing systems may be handled by the Communication Manager module(s) that manage the one or more computing nodes in at least some such embodiments. For example, in such situations, if such a non-managed computing system is provided with an actual IPv6 destination network address for such a managed computing node (e.g., "::0A:01:<Z-identifier>:10.0.0.2" for managed computing node A in this example), the non-managed computing system may send communications to computing node A via interconnection network 350 using that destination network address, and Communication Manager module R would forward those communications to computing node A (e.g., after re-headering the communications in a manner similar to that previously described) if Communication Manager module R is configured to accept communications from that non-managed computing system (or from any non-managed computing system). Furthermore, Communication Manager module R could generate a dummy virtual network address to correspond to such a non-managed computing system, map it to the actual IPv6 network address for the non-managed computing system, and provide the dummy virtual network address to computing node A (e.g., as the source address for the communications forwarded to computing node A from the non-managed computing system), thus allowing computing node A to send communications to the non-managed computing system.

Similarly, in at least some embodiments and situations, at least some managed computing nodes and/or their virtual networks may be configured to allow communications with other devices that are not part of the virtual network, such as other non-managed computing systems or other types of network appliance devices that do not have an associated Communication Manager module that manages their communications. In such situations, if the managed computing nodes and/or the virtual network is configured to allow communications with such other non-managed devices, such a non-managed device may similarly be provided with the actual IPv6 destination network address for such a computing node (e.g., "::0A:01:<Z-identifier>:10.0.0.2" for computing node A in this example), allowing the non-managed device to send communications to computing node A via interconnection network 350 using that destination network address, with Communication Manager module R then forwarding those communications to computing node A (e.g., after re-headering the communications in a manner similar to that previously described). Furthermore, Communication Manager module R could similarly manage outgoing communications from computing node A to such a non-managed device to allow computing node A to send such communications.

In addition, as previously noted, a Communication Manager module manages communications for associated computing nodes in various ways, including in some embodiments by assigning virtual network addresses to computing nodes of a virtual network address, and/or by assigning substrate physical network addresses to managed computing nodes from a range of substrate physical network addresses that correspond to the Communication Manager module. In other embodiments, some such activities may instead be performed by one or more computing nodes of the virtual network, such as to allow a DHCP (Dynamic Host Configuration Protocol) server or other device of a virtual network to specify virtual network addresses and/or substrate physical network addresses to particular computing nodes of the virtual network. In such embodiments, the Communication Manager module obtains such configuration information from the virtual network device(s), and updates its mapping information accordingly (and in some embodiments may further update one or more system manager modules that maintain information about computing nodes associated with virtual networks).

In addition, in some embodiments and situations, a managed computing node may itself be treated as a virtual router or phantom router, with multiple virtual network addresses associated with that managed computing node, and with that managed computing node forwarding communications to other computing nodes that correspond to those multiple virtual network addresses. In such embodiments, the Communication Manager module that manages communications for that managed computing node router handles communications to and from that computing node in a manner similar to that previously described. However, the Communication Manager module is configured with the multiple virtual network addresses that correspond to the managed computing node router, so that incoming communications to any of those multiple virtual network addresses are forwarded to the managed computing node router, and so that outgoing communications from the managed computing node router are given a substrate source physical network address that corresponds to the particular computing node that sent the communication via the managed computing node router. In this manner, physical routers or other networking devices of a particular customer or other entity may be virtually represented for a virtual network implemented for that entity.

FIG. 3B illustrates some of the computing nodes and communications discussed with respect to FIG. 3A, but provides additional details with respect to some actions taken by the Communication Manager modules 310 and 360 and/or the system manager module 390 to authorize communications between computing nodes. For example, after computing node A sends message 320-a to request a hardware address for computing node G, Communication Manager module R may perform one or more interactions 325 with the system manager module 390 in order to determine whether to provide that information, such as based on whether computing node A is authorized to communicate with computing node G, as well as to determine a corresponding substrate physical network address for computing node G based on interconnection network 350. If the Communication Manager module R has previously obtained that information and it remains valid (e.g., has not expired), then the interactions 325 may not be performed. In this example, to obtain the desired physical network address corresponding to computing node G, Communication Manager module R sends a message 325-1 to the system manager module 390 that includes the virtual network addresses for computing nodes A and G, and that includes an entity network identifier for each of the computing nodes, which in this example is an entity network identifier for entity Z (e.g., a 32-bit or 24-bit unique identifier,). In at least some embodiments, Communication Manager module R may send message 325-1 to the system manager module 390 using an anycast addressing and routing scheme, so that multiple system manager modules may be implemented (e.g., one for each data center that includes Communication Manager modules and associated computing nodes) and an appropriate one of those (e.g., the nearest, the most underutilized, etc.) is selected to receive and handle the message. After the system manager module 390 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the system manager module 390 returns a response message 325-2 that includes the desired actual physical network address corresponding to computing node G. In addition, in at least some embodiments, before sending the desired actual physical network address, the system manager module 390 may further verify that Communication Manager module R is authorized to send the message 325-1 on behalf of computing node A, such as based on computing node A being one of the computing nodes to which Communication Manager module R is associated.

In other embodiments, Communication Manager module R may perform some or all of the actions described as being performed by system manager module 390, such as to maintain provisioning information for the various computing nodes and/or to determine whether computing node A is authorized to send communications to computing node G, or instead no such authorization determination may be performed in some or all situations. Furthermore, in other embodiments other types of authorization determination may be performed for a communication between two or more computing nodes, such as based on a type of the communication, on a size of the communication, on a time of the communication, etc.

As previously noted with respect to FIG. 3A, after Communication Manager module S receives communication 330-3 intended for computing node G via the interconnection network 350, Communication Manager module S may perform one or more interactions 340 with the system manager module 390 in order to determine whether to authorize that communication. In particular, in this example, to verify that the communication 330-3 is valid and authorized to be forwarded to computing node G, Communication Manager module S first extracts the actual IPv6 destination network address and actual IPv6 source network address from the header of communication 330-3, and then retrieves the embedded entity network identifiers and virtual network addresses from each of the extracted IPv6 network addresses. The Communication Manager module S next exchanges messages 340 with system manager module 390 to obtain the corresponding actual IPv6 physical network address for the sending computing node A on behalf of computing node G, including a message 340-4 that includes the extracted virtual network addresses for computing nodes A and G and the entity network identifier for each of the computing nodes. In at least some embodiments, Communication Manager module S may send message 340-4 to the system manager module 390 using an anycast addressing and routing scheme.

The system manager module 390 receives message 340-4, and returns a response message 340-5 that includes the actual physical network address corresponding to computing node A, which in this example is "::0A:01:<Z-identifier>: 10.0.0.2". As previously discussed with respect to messages 325-1 and 325-2, in some embodiments the system manager module 390 and/or Communication Manager module S may further perform one or more other types of authorization determination activities, such as to determine that computing node G is authorized to communicate with computing node A, that Communication Manager module S is authorized to send the message 340-4 on behalf of computing node G, etc. Communication Manager module S then verifies that the returned physical network address in message 340-5 matches the source IPv6 network address extracted from the header of communication 330-3, so as to prevent attempts to spoof messages as being from computing node A that are actually sent from other computing nodes in other locations. Communication Manager module S optionally stores this received information in message 340-5 as part of an entry for computing node A in mapping information 362 for later use, along with computing node A's virtual network address and a dummy virtual hardware address for computing node A.

Various other types of actions than those discussed with respect to FIGS. 2A-2B may be performed in other embodiments, including for types of network addressing protocols other than IPv4 and IPv6.

Figure 3C:
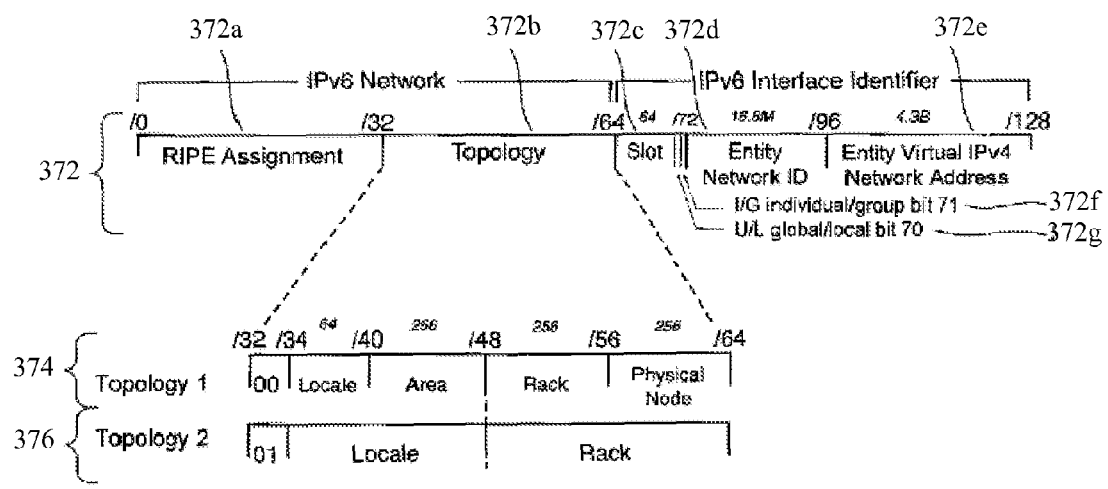
FIG. 3C illustrates an example of configuring underlying substrate network addresses so as to enable embedding of virtual network addresses for a virtual network.

FIG. 3C illustrates an example IPv6 physical substrate network address configuration 372 for use with the described techniques, with the example network address being configured so as to embed a virtual network address and other information in the substrate network address so as to enable an overlay network over the substrate network. As previously discussed, this example IPv6 network address configuration uses the 128-bit network address space to store various information, with the initial 64 bits storing an IPv6 network portion of the address, and with the subsequent 64 bits storing an interface identifier (or "host") portion of the address.

In this example, the initial 64-bit network portion of the IPv6 address includes a 32-bit identifier 372a for bits 0 through 31 that corresponds to a corporate or other organization identifier assigned to such an organization by an Internet registry operator on behalf of the Internet Assigned Numbers Authority (in this example, based on an assignment from the Regional Internet Registry RIPE NNC, or Réseaux IP Europeens Network Coordination Centre). For example, in some embodiments, an organization that operates a program execution service or other organization that uses the described techniques may have an associated identifier 372a. The initial 64-bit network portion of the address also includes a 32-bit group of information 372b in this example that corresponds to topology of a group of multiple computing nodes (e.g., a sub-network or other network portion) provided on behalf of the group whose identifier is indicated in information 372a. As previously discussed, in at least some embodiments, the initial 64-bit network portion of the address represents a partial network address for the substrate network that corresponds to a location of multiple related computing nodes, such as a sub-network or other portion of the substrate network. In particular, the initial 64-bit network address portion in at least some embodiments corresponds to a particular Communication Manager module that represents multiple associated computing nodes being managed by the Communication Manager module, such as based on the Communication Manager module managing the range of network addresses corresponding to some or all of the 64-bit interface identifier address portion in order to represent the various managed computing nodes. In other embodiments, the partial network address may be represented with a different number of bits (e.g., 72) and/or using a part of the address other than a prefix.

The 32-bit group of topology information 372b may represent various information in various ways in different embodiments, with topology information groups 374 and 376 showing two alternative example configurations of topology information. In particular, in the examples of 374 and 376, the first two bits (bits 32 and 33 of the overall IPv6 address) indicate a particular version of the topology information, such that the meaning of the remaining 30 bits may change over time. With respect to example 374, various bits as shown each indicate different geographical locales, geographic areas within the locales, computer racks within the geographic areas, and physical computing system nodes within the computer racks. In this example, the 6 bits for the locale information may represent 64 unique values, the 8 bits for the area information may represent 256 unique values for each locale value, the 8 bits for the rack information may represent 256 unique values for each area value, and the 8 bits for the physical computing system node information may represent 256 unique values for each rack value. Conversely, with respect to example 376, only locale and rack information is shown, but each have additional bits in order to represent those types of information, such as to have 16,384 unique locale values using its 14 bits, and to have 65,536 unique rack values using its 16 bits for each locale value. It will be appreciated that topology information may be represented in other manners in other embodiments.

In this example, the 64-bit interface identifier portion of the IPv6 address is configured to store several types of information, including an 6-bit identifier 372c that corresponds to a particular computing node slot (e.g., a particular virtual machine computing node on a particular physical computing system that corresponds to the initial 64-bit network portion of the IPv6 address), two 1-bit identifiers 372f and 372g, a 24-bit identifier 372d to embed an entity network identifier (e.g., to reference a particular virtual network), and a 32-bit identifier 372e to embed an IPv4 network address (e.g., a virtual network address). The 6 bits for the slot identifier may represent approximately 64 unique values, the 24 bits for the embedded entity network identifier may represent approximately 16.8 million unique values, and the 32 bits for the embedded IPv4 network address may represent approximately 4.3 billion unique values. In this example, the 1-bit identifier 372g (bit 70 of the IPv6 address) represents a U/L global/local bit that in some embodiments may indicate whether the address is globally administered or locally administered, and the 1-bit identifier 372f (bit 71 of the IPv6 address) represents an I/G individual/group bit that in some embodiments may indicate whether the address corresponds to a single computing node or to a group of multiple computing nodes (e.g., as part of a broadcast or multicast). In at least some embodiments, the I/G bit is set to zero, and the U/L bit is set to one when virtual forwarding of the corresponding communication is being used, such as for use in virtual subnetting via phantom computing node routers and/or to indicate that an incoming communication with such a destination address be delivered to a computing node corresponding to the value of the 6-bit slot identifier rather than a computing node corresponding to the values of the 32-bit IPv4 embedded network address and 24-bit entity network identifier. It will be appreciated that the interface identifier information may be represented in other manners in other embodiments.

Figure 4A:
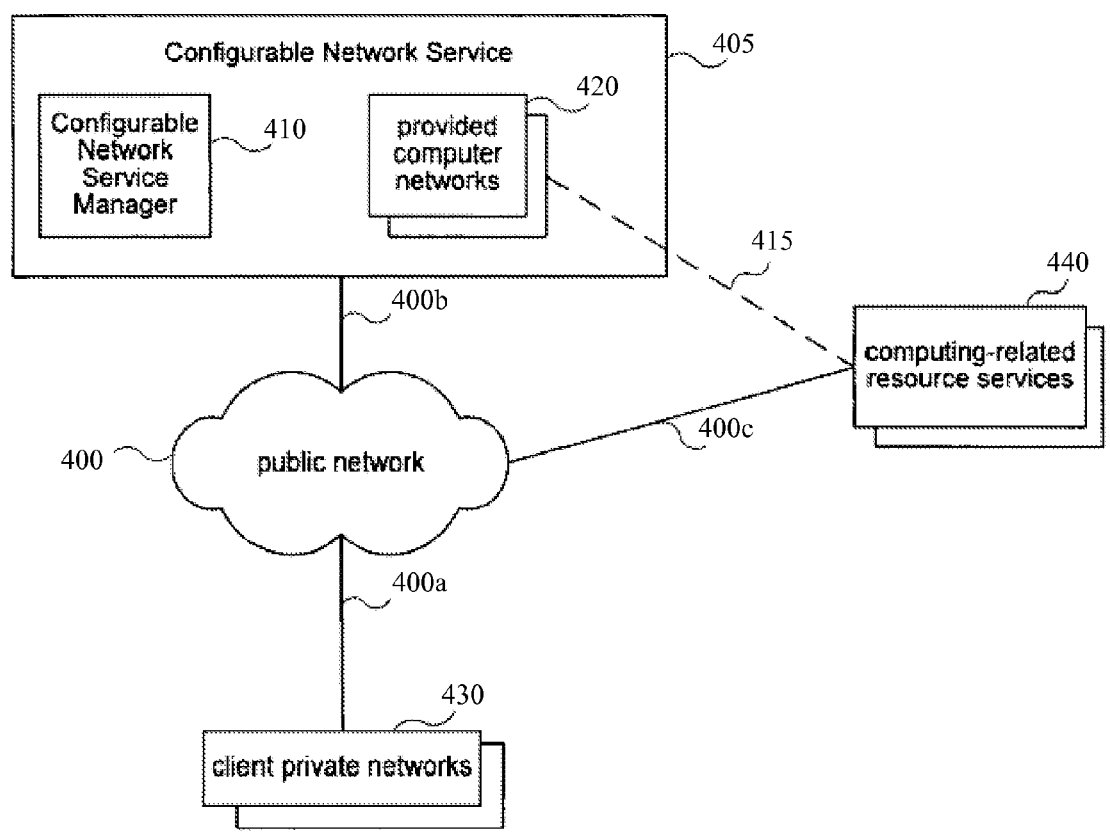
FIGS. 4A and 4B are network diagrams illustrating example embodiments of interactions that involve remote clients creating and configuring private computer networks.

FIG. 4A is a network diagram illustrating an example embodiment of a configurable network service that enables remote clients to create and configure computer networks for use by the clients. In this example, the computer networks that are created and configured are private network extensions to existing private computer networks of clients, and a Configurable Network Service 405 provides such functionality to clients (not shown) over one or more public networks 400 (e.g., over the Internet). Thus, the remote clients may use the Configurable Network Service ("CNS") 405 to dynamically modify the size and/or capabilities of their private computer networks, such as by using cloud computing techniques over the public networks 400.

In particular, in the example of FIG. 4A, a number of clients (not shown) are interacting over a public network 400 with a Manager module 410 to create and configure various private computer network extensions 420 to remote existing client private networks 430, with at least some of the computer network extensions 420 being configured to enable secure private access from one or more corresponding client private networks 430 over the public network 400 (e.g., via VPN connections established over interconnections 400a and 400b). In this example embodiment, the Manager module 410 assists in providing functionality of the CNS 405 to the remote clients, such as in conjunction with various other modules (not shown) of the CNS 405 and various computing nodes and networking devices (not shown) that are used by the CNS 405 to provide the private computer network extensions 420. In at least some embodiments, the CNS Manager module 410 may execute on one or more computing systems (not shown) of the CNS 405, and may provide one or more APIs that enable remote computing systems to programmatically interact with the module 410 to access some or all functionality of the CNS 405 on behalf of clients (e.g., to create, configure, and/or initiate use of private network extensions 420). In addition, in at least some embodiments, clients may instead manually interact with the module 410 (e.g., via a user interface provided by the module 410) to perform some or all such actions.

The public network 400 may be, for example, a publicly accessible network of linked networks, possibly operated by distinct parties, such as the Internet. The remote client private networks 430 may each include one or more existing private networks, such as a corporate or other private network (e.g., home, university, etc.) that is partially or wholly inaccessible to non-privileged users, and that includes computing systems and/or other networked devices of a client. In the illustrated example, the provided network extensions 420 each include multiple computing nodes (not shown), at least some of which are provided by or otherwise under the control of the CNS 405, and each of the provided network extensions 420 may be configured in various ways by the clients for whom they are provided. Each of the network extensions 420 in the illustrated embodiment may be a private computer network that is accessible only by the client that creates it, although in other embodiments at least some computer networks provided by the CNS 405 for clients may be publicly accessible and/or may be standalone computer networks that are not extensions to other existing computer networks. Similarly, while the provided computer networks 420 in the example are extensions to remote client computer networks 430 that are private networks, in other embodiments the provided computer networks 420 may be extensions to client computer networks 430 that are not private networks.

Private access between a remote client private computer network 430 and corresponding private computer network extension 420 provided for a client may be enabled in various ways, such as by establishing a VPN connection or other secure connection between them that allows intercommunication over the public network 400 in a secure private manner. For example, the CNS 405 may automatically perform appropriate configuration on its computing nodes and other computing systems to enable VPN access to a particular private network extension 420 of a client, such as by automatically configuring one or more VPN mechanisms hosted by the CNS 405 (e.g., software and/or hardware VPN mechanisms), and/or may automatically provide appropriate configuration information to the client (e.g., credentials, access points, and/or other parameters) to allow a VPN mechanism hosted on the remote client private network 430 to establish the VPN access. After VPN access has been appropriately enabled and/or configured, a VPN connection may be established between the remote client private network and the private network extension, such as initiated by the client using IPsec ("Internet Protocol Security") or other appropriate communication technologies. For example, in some embodiments, a VPN connection or other secure connection may be established to or between networks that use MPLS ("Multi Protocol Label Switching") for data transmission, such as instead of an IPsec-based VPN connection. Additional details regarding enabling and establishing secure connections, such as in response to client invocation of a corresponding remote access establishment API provided by the CNS 405, are discussed in greater detail elsewhere.

In addition, in the illustrated embodiment, various network-accessible remote resource services 440 are available to remote computing systems over the public network 400, including to computing systems on the remote client private networks 430. The resource services 440 may provide various functionality to the remote computing systems, such as for at least some of the resource services 440 to provide remote computing systems with access to various types of computing-related resources. Furthermore, at least some of the private network extensions 420 that are provided by the CNS 405 may be configured to provide private or other specialized access to at least some of the remote resource services 440, with that provided access optionally appearing to computing nodes of the private network extensions 420 as being locally provided via virtual connections 415 that are part of the private network extensions 420, although the actual communications with the remote resource services 440 may occur over the public networks 400 (e.g., via interconnections 400b and 400c). Additional details regarding establishing and using such private or other specialized access to remote resource services are discussed in greater detail elsewhere.

As previously noted, the provided network extensions 420 may each be configured by clients in various manners. For example, in at least some embodiments, the CNS 405 provides multiple computing nodes that are available for use with network extensions provided to clients, such that each provided network extension 420 may include a client-configured quantity of multiple such computing nodes that are dedicated for use as part of the provided network extension. In particular, a client may interact with the module 410 to configure a quantity of computing nodes to initially be included in a computer network provided for the client (e.g., via one or more programmatic interactions with an API provided by the CNS 405). In addition, in at least some such embodiments, computing nodes may later be dynamically added to or removed from a provided computer network of a client (e.g., via one or more programmatic interactions with an API provided by the CNS 405), such as after the provided computer network has already been in use by the client (e.g., by indicating to initiate or terminate execution of particular programs on particular computing nodes). Furthermore, the CNS 405 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client.

Figure 4B:
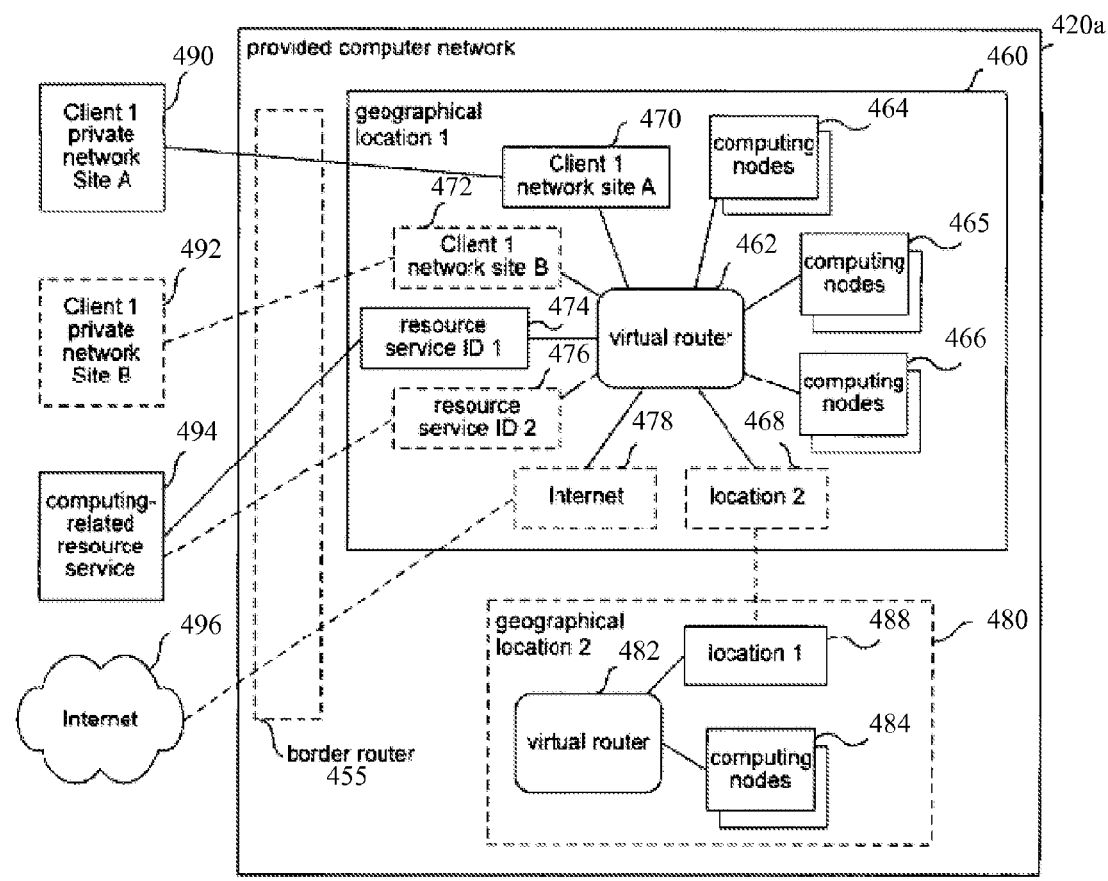

In addition, in at least some embodiments, a client may interact with the module 410 to configure network addresses for a computer network provided for the client (e.g., via one or more programmatic interactions with an API provided by the CNS 405), and network addresses may later be dynamically added, removed or modified for a provided computer network of a client in at least some such embodiments, such as after the provided computer network has already been in use by the client. For example, if a particular provided computer network that is being configured is an extension to an existing remote client computer network, the client may specify one or more address ranges (e.g., a Classless Inter-Domain Routing ("CIDR") address block) or other groups of network addresses that are a subset of the network addresses used by the existing remote client computer network, such that the specified network addresses are used for the computing nodes of the provided computer network. Such configured network addresses may in some situations be virtual or private network addresses that are not directly addressable from computing systems on the public network 400 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 400 (e.g., a public network address that is a static Internet-routable IP address or other non-changing network address). In other embodiments, the CNS 405 may automatically select network addresses to be used for at least some computing nodes of at least some provided computer network extensions, such as based on network addresses that are available for use by the CNS 405, based on selecting network addresses that are related network addresses used by remote existing computer networks corresponding to the provided computer networks, etc. In addition, in at least some embodiments in which the CNS 405 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 405 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 405 may assign the network addresses to various of the computing nodes selected for the provided computer network, such as in a random manner, by using DHCP ("Dynamic Host Configuration Protocol") or other techniques for dynamic assignment of network addresses, etc. In addition, even if public network addresses are used for a particular computer network, the CNS 405 may map one or more of those public network addresses for use in other manners, such as to use a particular public network address to act as an access mechanism for a particular remote resource service as described in greater detail elsewhere, so that communications sent to that particular public network address by computing nodes of that particular computer network will be forwarded to the corresponding remote resource service rather than to another computing system on the Internet or other network to which that particular public network address is assigned. FIG. 4B provides additional details regarding an example of using configured network addresses to route communications within a provided computer network.

In addition, in at least some embodiments, a client may interact with the module 410 to configure network topology information for a computer network provided for the client (e.g., via one or more programmatic interactions with an API provided by the CNS 405), and such network topology information may later be dynamically modified for a provided computer network in at least some such embodiments, such as after the provided computer network has already been in use by the client. For example, a client may specify particular types of networking devices (e.g., routers, switches, etc.) and/or other network devices or nodes (e.g., firewalls, proxies, network storage devices, printers, etc.) to be part of the provided computer network, and/or may specify subsets of the computing nodes of the provided computer network to be grouped together or that are to otherwise share common intercommunication characteristics (e.g., a particular subset of computing nodes that are part of a subnet for which intercommunications are not filtered and/or that are associated with a particular networking device). In addition, the specified configuration information for a provided computer network may in at least some embodiments include routing information or other interconnectivity information between networking devices and/or groups of computing devices. Furthermore, in at least some embodiments, the CNS 405 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 405 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; etc.).

As discussed in greater detail elsewhere, in at least some embodiments, the interconnections and intercommunications between computing nodes of a provided computer network are managed using an underlying substrate network of the CNS 405, and if so, some or all of the configured network topology information may be simulated in at least some such embodiments using the underlying substrate network and corresponding modules of the CNS 405. For example, each of the computing nodes provided by the CNS 405 may be associated with a node communication manager module of the CNS 405 that manages communications to and from its associated computing nodes. If so, firewall devices may be simulated by using the associated communication manager module for a computing node to disallow or otherwise handle communications to and/or from the computing node in a manner consistent with one or more simulated firewall devices. Such node communication manager modules may similarly simulate routers and subnets by controlling how and whether intercommunications are passed between computing nodes, and by responding to requests from computing nodes for information (e.g., ARP, or address resolution protocol, requests) with appropriate response information. One or more external communication manager modules of the CNS 405 may manage communications between the computing nodes provided by the CNS 405 and external computing systems, such as to similarly simulate firewall devices and enforce specified network access constraints, as well as to manage configured access mechanisms for remote resource services and secure connections to remote client private computer networks. Other types of network topology information may be similarly simulated.

In addition, in at least some embodiments, a client may interact with the module 410 to configure various network access constraint information for a computer network provided for the client (e.g., via one or more programmatic interactions with an API provided by the CNS 405), and such network access constraint information may later be dynamically modified for a provided computer network in at least some such embodiments, such as after the provided computer network has already been in use by the client. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which private or other specialized access has been established, external to the provided computer network and any corresponding remote client computer network, etc.); types of other computing systems; etc. In addition, as discussed in greater detail elsewhere, in at least some embodiments a provided computer network may be configured to provide private or other specialized access to one or more remote resource services, such as via a configured access mechanism that is part of or otherwise local to the provided computer network. In a manner similar to that for network topology information and other routing information, the CNS 405 may enforce network access constraint information for provided computer networks in various manners.

FIG. 4B illustrates additional details regarding an example computer network 420a that may be provided by the CNS 405 (or other embodiment of a configurable network service) for a client, with the provided computer network 420a in this example being a private network extension to a remote private computer network of the client, such as one of the remote private computer networks 430 of FIG. 4A. In this example, various connections and communication paths for the provided computer network 420a are shown in a conceptual manner to illustrate types of configurable network access constraints and network topology.

In particular, in FIG. 4B, the provided computer network 420a includes various computing nodes provided by the CNS 405 that are located at a first geographical location 1 460 (e.g., at a first data center at the geographical location 1), with the various computing nodes being configured into logical groups 464, 465 and 466 in this example (e.g., to correspond to different subnets and/or associated configured networking devices, not shown). In this example, a single conceptual virtual router 462 is shown at geographical location 1 to control communications between those computing nodes and other computing systems, so as to illustrate different types of communications that may occur, although the provided computer network 420a may actually have multiple or no configured networking devices at geographical location 1, and the computer network 420a may be implemented by the configurable network service at the geographical location 1 in various manners, such as via multiple physical interconnected routers or other networking devices, by using an underlying substrate network and associated modules that control communications over the underlying substrate network, etc. In this example, the virtual router 462 operates in accordance with the configured information for the provided computer network 420a, including configured network topology information, configured private or other specialized access to remote resource services, and other configured network access constraint information, such as to route communications that are sent to network addresses within the provided computer network 420a to corresponding destination computing nodes on the provided computer network 420a, and to route other communications to other network addresses outside of the provided computer network 420a as appropriate. Furthermore, communications that are not permitted by configured firewall devices, configured network topology information, or other configured network access constraints may be blocked or otherwise managed by the virtual router 462.

In this example, the computer network 420a is provided for an example Client 1, and is a network extension to a remote computer network of Client 1. Client 1's remote computer network includes multiple computing systems (not shown) at a first remote location Site A 490, and the virtual router 462 is configured to communicate with those multiple computing systems via a virtual communication link 470 at the geographical location 1. For example, as discussed in greater detail elsewhere, the provided computer network 420a may include one or more configured VPN connections to the multiple computing systems at Site A 490, and the communication link 470 may correspond to one or more such VPN connections. In addition, the remote computer network of Client 1 may optionally include computing systems at one or more other locations, such as the illustrated optional Site B 492, and if so the virtual router 462 may further be configured to communicate with those other computing systems at the other locations, such as via an optional virtual communication link 472 to Site B 492 (e.g., via one or more other configured VPN connections directly to Site B). When multiple VPN connections or other secure connections are used to remote computing systems of a remote computer network, each connection may correspond to a subset of the remote computing systems (e.g., by being associated with a subset of the network addresses of the remote computer network that correspond to those remote computing systems), so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Furthermore, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the provided computer network 420a may be configured to allow all, some or no communications between the computing nodes of the provided computer network 420a and other external computing systems that are generally accessible on the Internet 496 or other public networks. If at least some such external communications are allowed, the virtual router 462 may further be configured to communicate with those external multiple computing systems via an optional virtual communication link 478 of the provided computer network 420a, such as in conjunction with an optional virtual border router 455 for the provided computer network 420a. The virtual border router 455 may be physically implemented in various manners, such as by the CNS 405 using one or more actual firewall devices or border router devices that manage communications between external computing systems and the various computing nodes provided by the CNS 405 at geographical location 1 (e.g., actual devices that support numerous computer networks provided by the CNS 405 to clients that use those computing nodes of the CNS 405), by using an underlying substrate network and associated modules that control communications over the underlying substrate network (e.g., to prevent disallowed communications from being sent by computing nodes of the provided computer network 420a onto the substrate network), etc. Furthermore, the virtual border router 455 may further conceptually assist in managing other communications to other computing systems external to the provided computer network 420a, such as to the remote client computer network at Sites A and B, to one or more remote resource services, etc.

In addition, the provided computer network 420a may be configured to provide private or other specialized access to one or more remote resource services, such as by assigning one or more network addresses of the provided computer network 420a to represent those one or more remote resource services, and by optionally configuring particular actions to be taken for communications sent to those assigned network addresses. In this example, the virtual router 462 has been configured to provide local access to remote resource service 494 via a virtual communication link 474 of the provided computer network 420a. Thus, for example, if one of the computing nodes of the provided computer network 420a sends a communication to a particular network address of the provided computer network 420a that is mapped to the communication link 474, the virtual router may forward that communication to the remote resource service 494 external to the provided computer network 420a (e.g., via the Internet or other public networks). In other embodiments, the remote resource service 494 may implement an interface that is part of the CNS 405 or otherwise at the geographical location 1, and if so the communications sent to the particular network address of the provided computer network 420a that is mapped to the communication link 474 may instead be forwarded to that interface of the remote resource service for handling.

In addition, the virtual communication link 474 may be configured in at least some embodiments to manage communications sent via the link in various manners, such as to modify those communications in one or more manners before they are forwarded to the remote resource service 494, or to otherwise access the remote resource service 494 in a specialized manner. For example, in the illustrated embodiment, the virtual communication link 474 may be configured to correspond to a particular namespace within the remote resource service 494, with a subset of the computing-related resources provided by the remote resource service 494 being part of that namespace. Accordingly, the virtual communication link 474 may be configured to access resources within the particular namespace, such as by modifying or translating communications to use a name or other identifier associated with the particular namespace, by using a particular interface of the remote resource service that supports indicating a particular namespace, etc. In addition, if the virtual communication link 474 is configured to correspond to a particular namespace or to otherwise correspond to a subset of the resources provided by the remote resource service 494, the provided computer network 420a may optionally be further configured to include one or more other virtual communication links that also correspond to the same remote resource service 494 but are configured to access the remote resource service 494 in other manners. For example, the provided computer network 420a may optionally include a distinct virtual communication link 476 that is configured to access the remote resource service 494 in a distinct manner than that of virtual communication link 474, such as to correspond to a distinct second namespace, to not correspond to any particular namespace, to use an identifier of a customer of the remote resource service 494 that is distinct from a customer identifier used for communication link 474, etc. In this example, the virtual communication links 474 and 476 are configured to use different identifiers (e.g., different namespace identifiers), which are represented in this example as ID 1 and ID 2 for the links 474 and 476, respectively. Thus, the computing nodes of the provided computer network 420a may be able to access different types of functionality from remote resource 494. Furthermore, while not illustrated here, the provided computer network 420a may be similarly configured to access one or more other remote resource services (not shown) using other virtual communication links to those other remote resource services.

In addition to or instead of configuring the virtual communication link 474 to access a particular namespace of the remote resource service 494, the virtual communication link may be configured in at least some embodiments to provide additional information to the remote resource service 494 to allow the remote resource service 494 to validate the location or other source of the communications as being the provided computer network 420a. For example, in the illustrated embodiment, the virtual communication link 474 may be configured to correspond to one or more particular identifiers or other access control indicators that are associated with the provided computer network 420a by the configurable network service or by the remote resource service 494, so that a subset of new and/or existing computing-related resources provided by the remote resource service 494 that are accessed via the virtual communication link 474 are associated with the access control indicator(s), for use by the remote resource service 494 in restricting access to those resources. Accordingly, the virtual communication link 474 may be configured to use the specified additional indicator(s) associated with the provided computer network 420a in various manners, such as to modify communications to include the additional indicator(s), to send the additional indicator(s) along with the communications without modification of the communications, to use a particular interface of the remote resource service that supports including such additional indicator(s), etc. In addition, if the virtual communication link 474 is configured to correspond to one or more additional indicators, the provided computer network 420a may optionally be further configured to include one or more other virtual communication links that also correspond to the same remote resource service 494 but are configured to access the remote resource service 494 in other manners. For example, the provided computer network 420*a* may optionally configure the distinct virtual communication link 476 to access the remote resource service 494 without using any additional indicators (e.g., to provide the same access to the remote resource service 494 as would otherwise be publicly available), to use one or more other additional access control indicators that are distinct from those used with virtual communication link 474, to use an identifier of a customer of the remote resource service 494 that is distinct from a customer identifier used for virtual communication link 474, etc. Furthermore, while not illustrated here, the provided computer network 420*a* may be similarly configured to access one or more other remote resource services (not shown) using other virtual communication links to those other remote resource services, such as other virtual communication links that are configured to use the same one or more additional indicators as virtual communication link 474, or that are otherwise configured.

In the illustrated embodiment, in addition to the computing nodes of the CNS 405 at geographical location 1, the provided computer network 420 may further include computing nodes 484 provided by the CNS 405 that are located at a second geographical location 2 480 (e.g., at a distinct second data center at the geographical location 2). Accordingly, the virtual router 462 may be configured to include an optional virtual communication link 468 to the portion of the provided computer network 420*a* at the geographical location 2. In this example, the portion of the provided computer network 420*a* at the geographical location 2 similarly is illustrated with a conceptual virtual router 482 to manage communications to and from the computing nodes 484, including to communicate with the portion of the provided computer network 420 at the geographical location 1 via a virtual communication link 488. Such communications between computing nodes of the CNS 405 at different geographical locations may be handled in various manners in various embodiments, such as by sending the communications over the Internet or other public networks (e.g., as part of a secure tunnel, such as that uses encryption supported by the CNS 405), by sending the communications in a private secure manner (e.g., via a dedicated lease line between the geographical locations), etc. In addition, while not illustrated here, the portion of the provided computer network 420*a* at the geographical location 2 may similarly include some or all of the same types of other virtual communication links illustrated for the portion at geographical location 1, such as to a remote client private network (e.g., via one or more VPN connections distinct from any VPN connections to the geographical location 1), to remote resource services, to the Internet, etc.

It will be appreciated that the example provided computer network 420*a* of FIG. 4B is included for exemplary purposes, and that other computer networks provided by the CNS 405 for clients may not include all of the types of configured communications links and network topology information, and/or may include other types of configured communications links and network topology information that is not illustrated here. For example, in some embodiments and situations, a provided computer network may include configured devices and other resources in addition to or instead of computing nodes, and if so, each such other resource may optionally be assigned a network address of the provided computer network. Furthermore, the conceptual devices and communication links illustrated in FIG. 4B may be implemented using a variety of types of underlying physical devices, connections and modules. In addition, while not illustrated here, clients may perform a variety of other types of interactions with remote resource services, whether from provided computer networks or instead other remote computing systems, such as to subscribe/register to use resource, receive/create various credentials (e.g., user IDs, passwords, etc.), create resources and/or namespaces from other remote computing systems (e.g., that are part of a remote private corporate network) that are later accessed from a provided computer network (e.g., a network extension to the private corporate network), etc.

Figure 5:
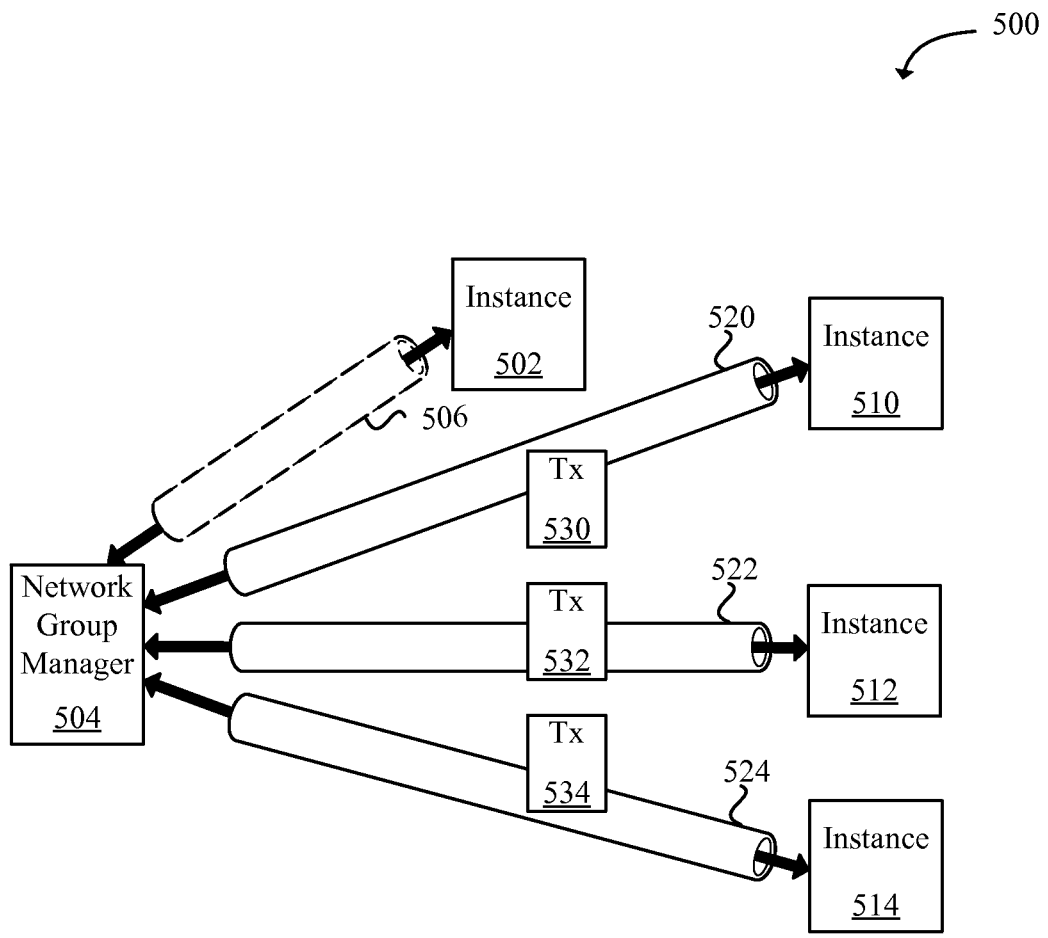
FIG. 5 illustrates an example of a virtualized computing instance registering as a member of a network group.

FIG. 5 illustrates an example of a virtualized computing instance 502 registering as a member of a network group on a virtual network 500 overlaid on a physical network substrate. Prior to the virtualized computing instance 502 registering as a member of the network group, the network group may include the virtualized computing instances 510, 512, 514. A network group manager 504 may be involved in managing communications of the network group on the virtual network 500. In one example use of the technology, the virtualized computing instance 502 may register as a member of the network group by establishing an open connection 506 to the network group manager 504. The dotted tube indicates that the open connection 506 may be in the process of being established.

The virtual network may use the Internet Protocol (IP) and the open connection 506 may be a transmission control protocol (TCP) connection. After a standard TCP establishment handshake, the open connection 506 may be established. In the process of establishing the open connection 506, the network group manager 504 may register the virtualized computing instance 502 as a member of the network group, and a set of transmissions 530, 532, 534 may be sent to members of the network group. In particular, open connections 520, 522, 524 may have been previously established with the virtualized computing instances 510, 512, 514, respectively, for the purpose of similarly maintaining membership information with those virtualized computing instances 510, 512, 514.

To maintain the open connections 506, the network group manager 504 may send periodic TCP keepalive transmissions to the virtualized computing instances 502, 510, 512, 514. Thus, the network group manager 504 may implement a long polling mechanism with the virtualized computing instances 502, 510, 512, 514.

Figure 6:
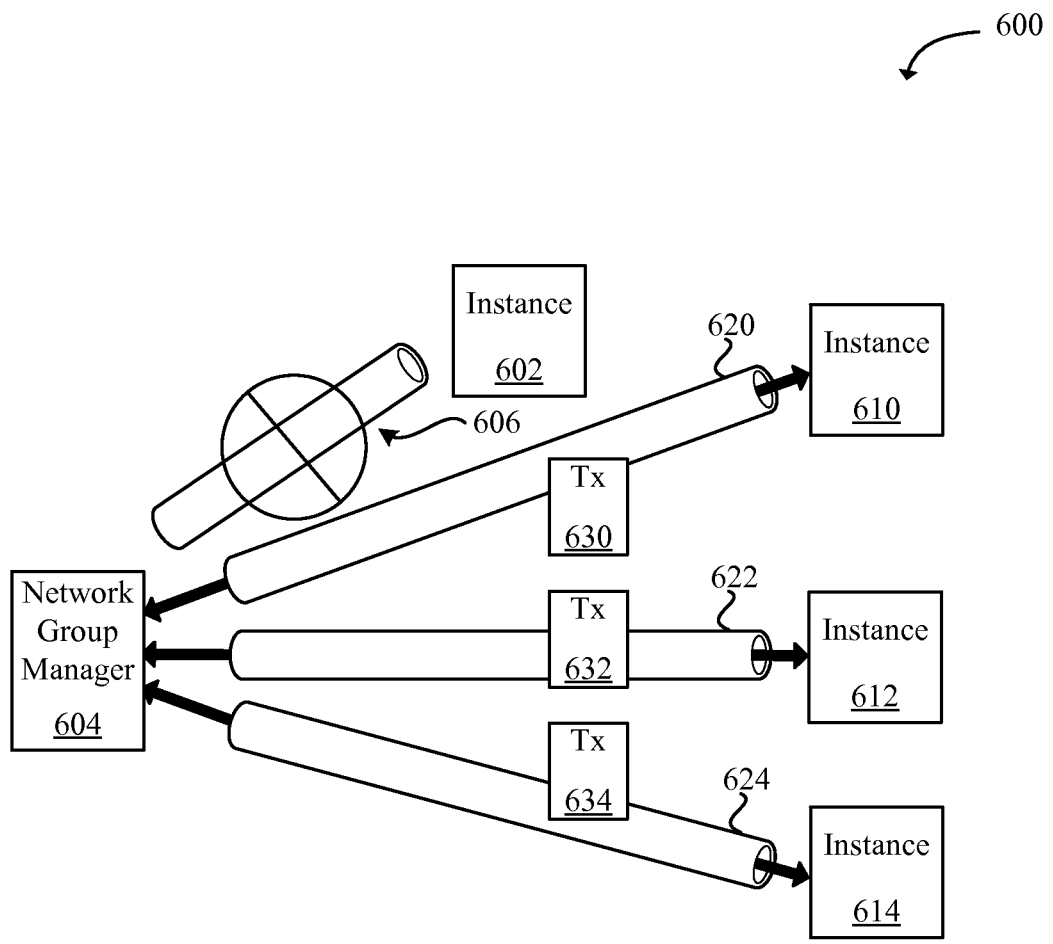
FIG. 6 illustrates an example of a virtualized computing instance deregistering as a member of a network group.

Similarly, FIG. 6 may illustrate an example of a virtualized computing instance 602 deregistering as a member of a network group on a virtual network 600 overlaid on a physical network substrate. Prior to the virtualized computing instance 602 deregistering as a member of the network group, the network group may include the virtualized computing instances 602, 610, 612, 614. A network group manager 604 may manage communications of the network group on the virtual network 600. In one example use of the technology, the virtualized computing instance 602 may deregister as a member of the network group by terminating an open connection 606 to the network group manager 604.

The virtual network may use IP, and the open connection 606 may be a TCP connection. In one example, the virtualized computing instance 602 may be deregistered as a member of the network group by the network group manager 604 when a keepalive transmission indicates that the open connection 606 has been terminated (e.g., no response to a keepalive transmission is received from the intended recipient). When the network group manager 604 deregisters the virtualized computing instance 602, a set of transmissions 630, 632, 634 may be sent to members of the network group. The set of transmissions 630, 632, 634 may indicate that the virtualized computing instance 602 is no longer a part of the network group. Thus, the set of transmissions 630, 632, 634 may include an IP address for the virtualized computing instance 602 so that virtualized computing instance 602 can be removed from stored tables on the virtualized computing instances 610, 612, 614. Future transmissions to the network group would then no longer include a transmission to the virtualized computing instance 602. In particular, open connections 620, 622, 624 may have been previously established with the virtualized computing instances 610, 612, 614, respectively, for the purpose of maintaining membership information with those virtualized computing instances 610, 612, 614.

Figure 7:
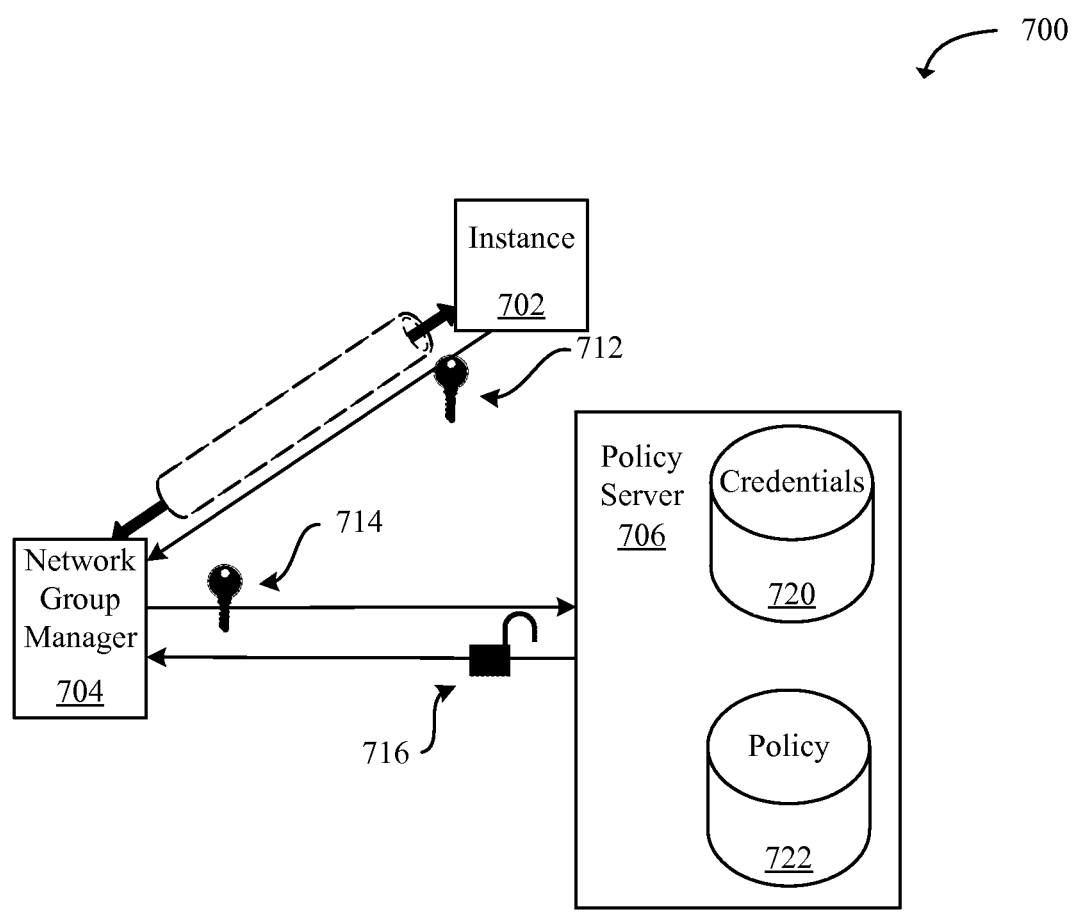
FIG. 7 illustrates an example of a policy server limiting access to a network group.

FIG. 7 illustrates an example 700 of a policy server 706 limiting access to a network group. The policy server 706 may be connected to a credentials data store 720 and a policy data store 722 and include a policy evaluation engine. The credentials data store 720 may hold user information such as a username and password, for instance. As another example, the credentials data store 720 may contain user certificates, a public key, a private key, or an asymmetric key. The policy data store 722 may store permissions or access rights for various users. The credentials data store 720 may also contain session data for currently authenticated users. The credentials data store 720 may have account records that relate to various records in the policy data store 722. For example, a user may have records stored in the credentials data store 720 including a username (e.g. "user@example.com"), a user identifier (e.g. 123456789) and a public key for the user. The policy data store 722 may have one or more records that include an access right or permission related to a network group and a reference to the user identifier for the user. One such access right may be rights to join, for instance, a network group. Thus, the policy server 706 may be able to limit access to the network group by applying a network policy and a stored set of credentials and permissions.

In a particular example, a network group manager 704 may receive a registration request from a virtualized computing instance 702. The registration request may include, or be associated, with a signature generated using a key 712. For example, each instance may be provisioned or may access a key that can be used to sign requests to join a group. Before registering the virtualized computing instance as a member of a network group, in this illustrated example, the network group manager 704 may forward the signed request 714 to the policy server 706 for authentication and validation. In an alternative example, the virtualized computing instance 702 may communicate directly with the policy server 706 prior to requesting registration to the network group with the network group manager 704. The virtualized computing instance 702, for instance, may receive a signed token, for instance, from the policy server 706 which the virtualized computing instance 702 may then provide as part of a registration request with the network group manager 704.

In the illustrated example, the policy server 706 may evaluate the request by verifying that the signature was created with the key and verifying that a policy exists that authorizes the instance 702 to join the network group. In the instance where the request is approved, the policy server 706 can return a signed or encrypted permission token 716 to the network group manager 704 to indicate that the virtualized computing instance 702 has been successfully authenticated and that the virtualized computing instance 702 has adequate permissions to register as a member of the network group. Alternatively, the policy server 706 may simply return a "success" code that indicates the request is approved. In another example, the policy server 706 may return a message to the network group manager 704 to indicate that the virtualized computing instance 702 has been successfully authenticated and that the virtualized computing instance 702 has adequate permissions to register as a member of the network group.

A virtualized computing instance may also be granted access to the network group upon initialization. In virtualized computing, an instance may be initiated and stopped. This initiating and stopping of a virtualized computing instance is somewhat analogous to turning a physical computing machine on and off, respectively. Thus, in initiating a virtualized computing instance in the virtualized computing environment, an identifier may be assigned to the virtualized computing instance by the management component (210 FIG. 2) and the network group manager may be notified by the management component that the virtualized computing instance with the identifier has access to the network group. In this way, the network group manager may allow the virtualized computing instance to join the network group grant access to the virtualized computing instance without a join request from the virtualized computing instance.

Figure 8:
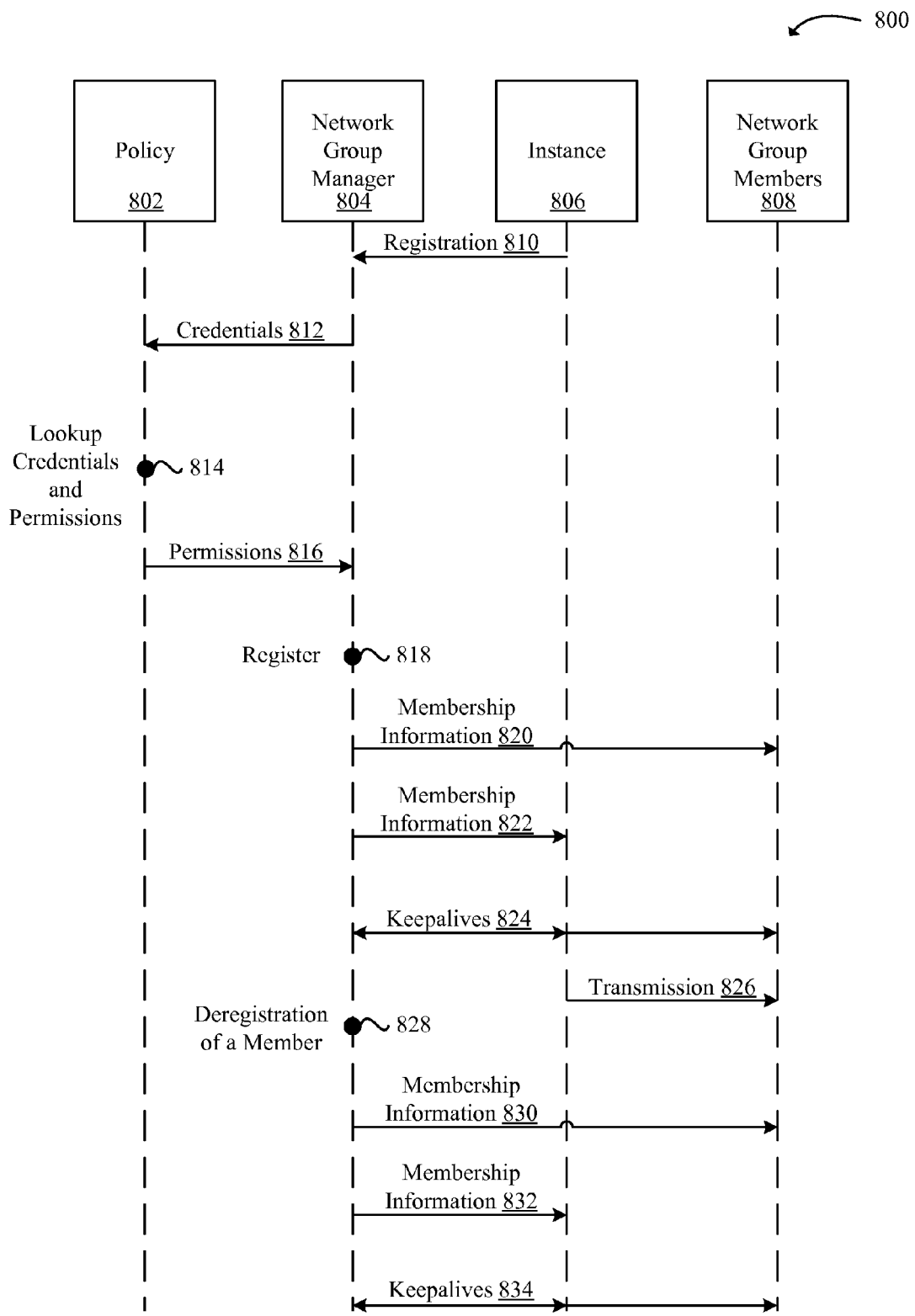
FIG. 8 is a sequence diagram illustrating an example of network participation in a virtual network.

FIG. 8 is a sequence diagram 800 illustrating an example of network participation in a virtual network for creation and management of network groups. Network participants shown in the sequence diagram 800 may include a policy server 802, a network group manager 804, a virtualized computing instance 806 and network group members 808.

The virtualized computing instance 806 may have a network address for communicating with member instances on the virtual network and may register 810 the network address on the virtual network as a member of a network group. The virtual network may be within a virtualized computing environment. As part of the registration 810, authentication materials (e.g., credentials, digital signatures, etc.) may be provided and passed, in 812, to the policy server 802 for verification. Thus, the policy server 802 may look up the credentials and association permissions in 814 and provide a set of response permissions 816.

Upon receiving the response permissions 816, the network group manager 804 may register 818 the virtualized computing instance 806 in a specific network group. As a follow-up to the registration, membership information 820 for virtualized computing instances in the network group may be sent to the network group members 808 (i.e., members of the network group). In particular, the network group members 808 may receive membership information, including a network address, to indicate that the virtualized computing device 806 has joined the network group. Likewise, the virtualized computing instance 806 may receive a list of network addresses for the network group members 808. While the virtualized computing instance 806 is shown separately from the network group members 808, it should be understood that this separation is to illustrate the virtualized computing instance 806 registering as a member of the network group. Thus, after joining the network group, the virtualized computing instance 806 may be a co-equal member of the network group along with the other network group members 808.

The network group manager 804 may then maintain an open connection to each of the members of the network group (i.e. the virtualized computing instance 806 and the network group members 808). Maintaining an open connection to each of the members of the network group may include sending keepalive messages 824 to each of the members of the network group, in one example.

In 826, the virtualized computing instance 806 may transmit a message to the network group members 808. A unicast transmission containing the same message for each network group member 808, for instance, may be sent to each of the network group members 808.

One of the network group members of the network group may leave, as illustrated at 828, in which case, membership information may again be sent at 830 and 832 indicating that the member has deregistered from the network group. As above, when the membership of the network group changes, membership address information may be sent over the open connections to the network addresses for use in communicating with the network group using unicast transmissions to create multicast transmissions. In 834, keepalives 834 may be transmitted from the network group manager 804 to the virtualized instance 806 and the network group members 808.

Figure 9:
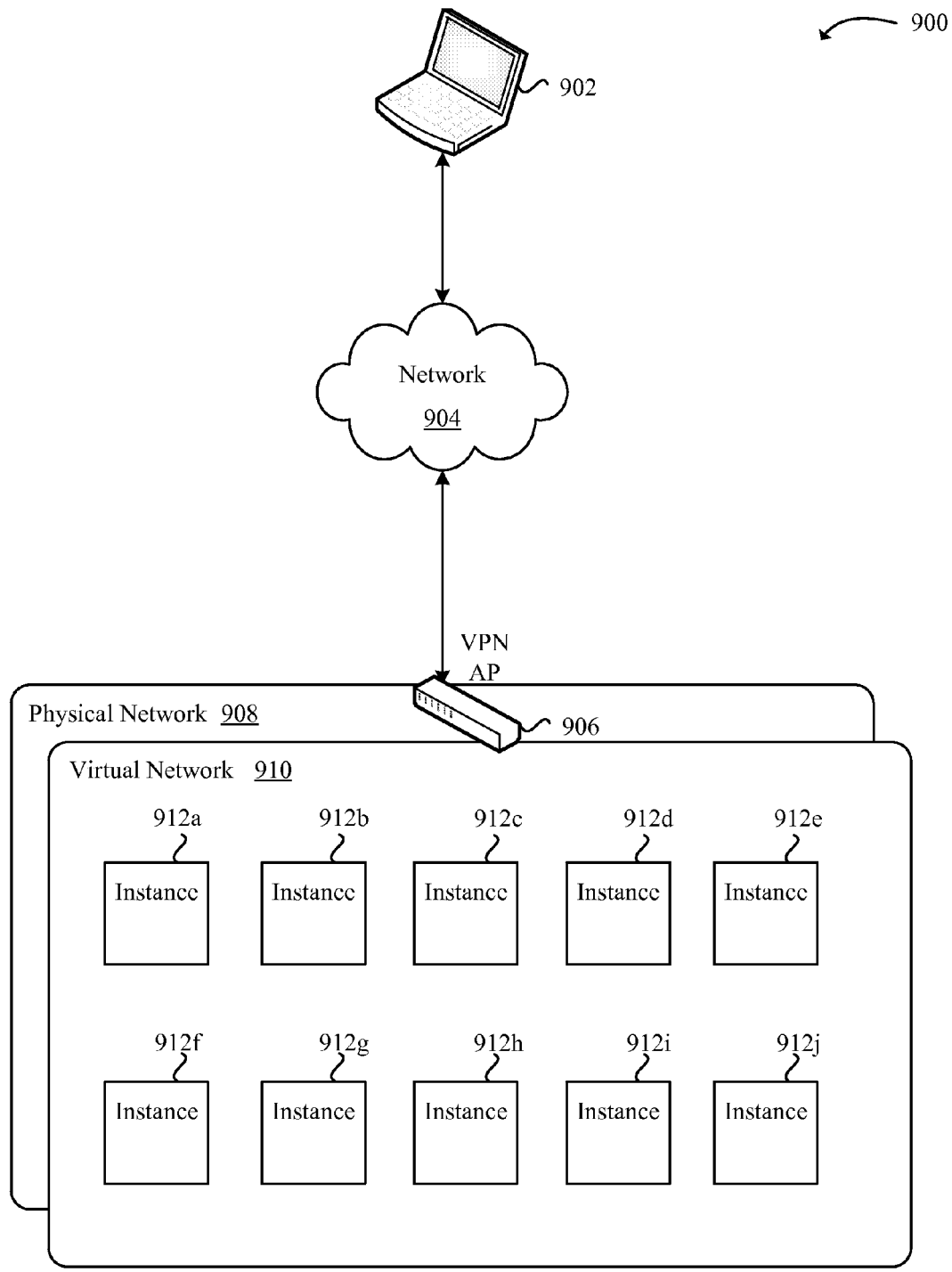
FIG. 9 illustrates an example of using a virtual private network (VPN) access point (AP) to incorporate an external network into a virtual network.

FIG. 9 illustrates an example 900 of using a virtual private network (VPN) access point (AP) 906 to incorporate an external network 904 into a virtual network 910. The virtual network 910, as discussed above with particular reference to FIG. 1, may be a virtual network 910 in a virtualized computing system that is overlaid on a physical network 908 and other physical hardware components underlying the operation of the virtual network 910. Moreover, the virtual network may include a plurality of virtualized computing instances 912*a-j*. Incorporation of the external network 904 into the virtual network 910 may be partial. For instance, the network 904 may be the Internet and a VPN may be formed with a small subset of the member instances on the Internet. For example, an on-site datacenter at a customer's office may be connected to the virtual network 910 using the VPN AP 906. Further, a member instance 902 may represent one or more physical or virtualized computing instances communicatively reachable through the external network 904.

A VPN is generally used to extend a private network across a public network, such as the Internet. Thus, a computer may send and receive data across the public network (i.e. the external network 904) as if it were directly connected to the private network (i.e. the virtual network 910). VPNs may provide the functionality, security and management policies of the private network. In this way, using the VPN AP 906, a VPN connection with the external network 904 may be established to incorporate the external network 904, either in part or in whole, into the virtual network 910. The VPN AP 906 may be dedicated hardware that a customer purchases to put within a corporate office site that connects to a virtual computing environment or may be a software suite downloaded for establishment of a VPN. Thus, a virtual point-to-point connection, for example may be established through the use of an encrypted tunnel. Examples of VPN protocol suites include the point-to-point tunneling protocol (PPTP), the OpenVPN® protocol suite and the IP protocol security (IPSec) protocol suite.

Figure 10:
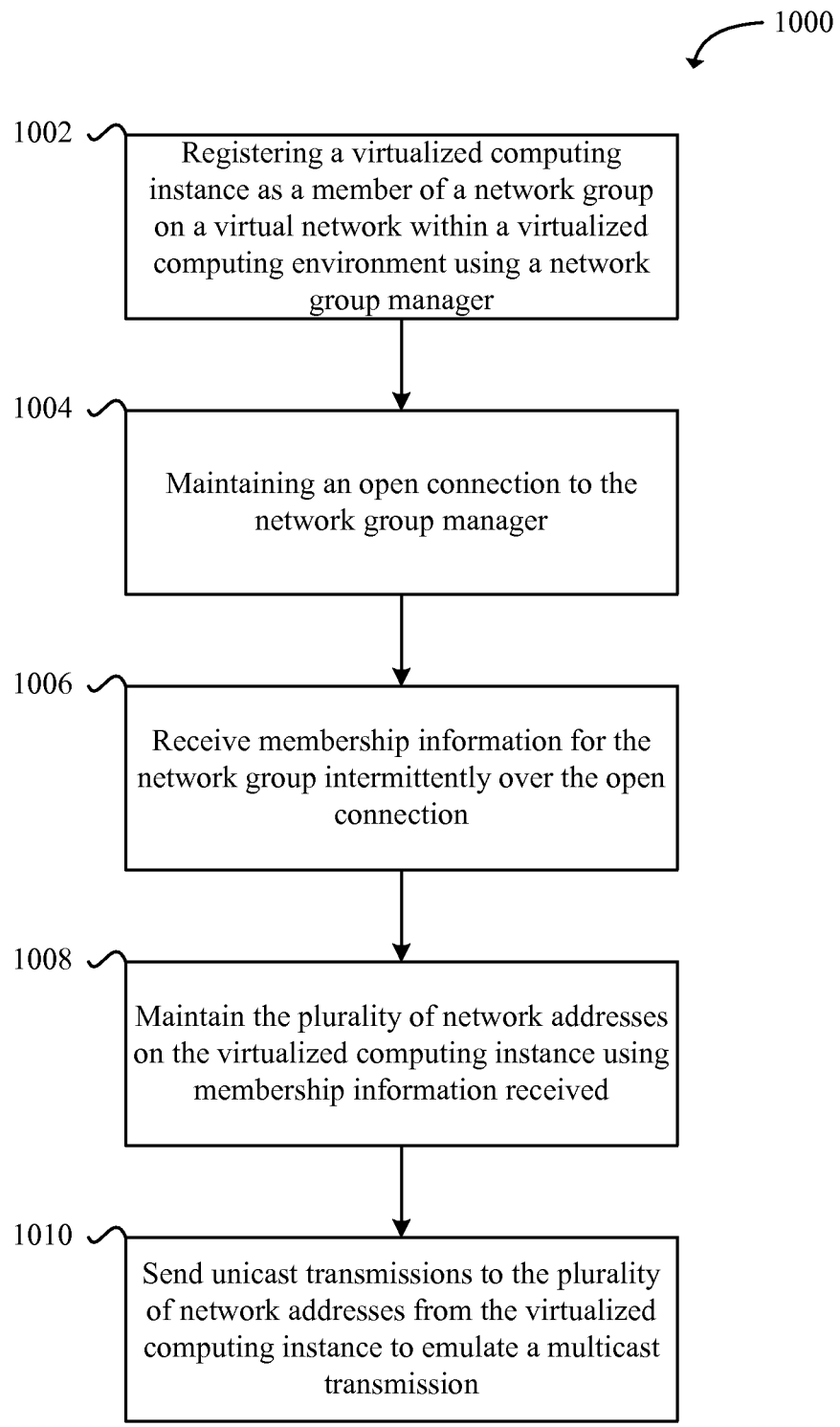
FIG. 10 is a flowchart illustrating an example method for participating in a group on a network.

FIG. 10 is a flowchart illustrating an example method 1000 for participating in a network group. The method 1000 may include registering a virtualized computing instance as a member of a network group on a virtual network within a virtualized computing environment by registering a network address of the virtualized computing instance as a member of the network group using a network group manager, as shown in method element 1002. An open connection to the network group manager can be maintained, as shown in method element 1004. A virtual network is a computer network which is built on top of an underlying network. Nodes in the virtual network may be connected by virtual links that correspond to a path through one or more physical links in the underlying network. The open connection, for example may be implemented using TCP keepalive messages. The method may include the operation of receiving membership information for the network group intermittently over the open connection including a plurality of network addresses of current members of the network group, as shown in method element 1006. For instance, a TCP connection may be used to implement a long polling mechanism between a virtualized computing instance and a network group manager. The network group manager may be provided on a single server as a software daemon, or may be provided simply as an interface service running somewhere on the network, possibly alongside a number of other group manager services.

The method may also include maintaining the plurality of network addresses on the virtualized computing instance using membership information received, as shown in method element 1008, and sending unicast transmissions to the plurality of network addresses from the virtualized computing instance to create a multicast transmission, as shown in method element 1010. The unicast transmissions may be copies of the same message transmitted a plurality of times to each of the plurality of network addresses. In one example, the virtualized computing instance may create a table that lists current members of the network group. In such a scenario, duplicate unicast transmissions may be sent to each of the network addresses listed in the table.

Figure 11:
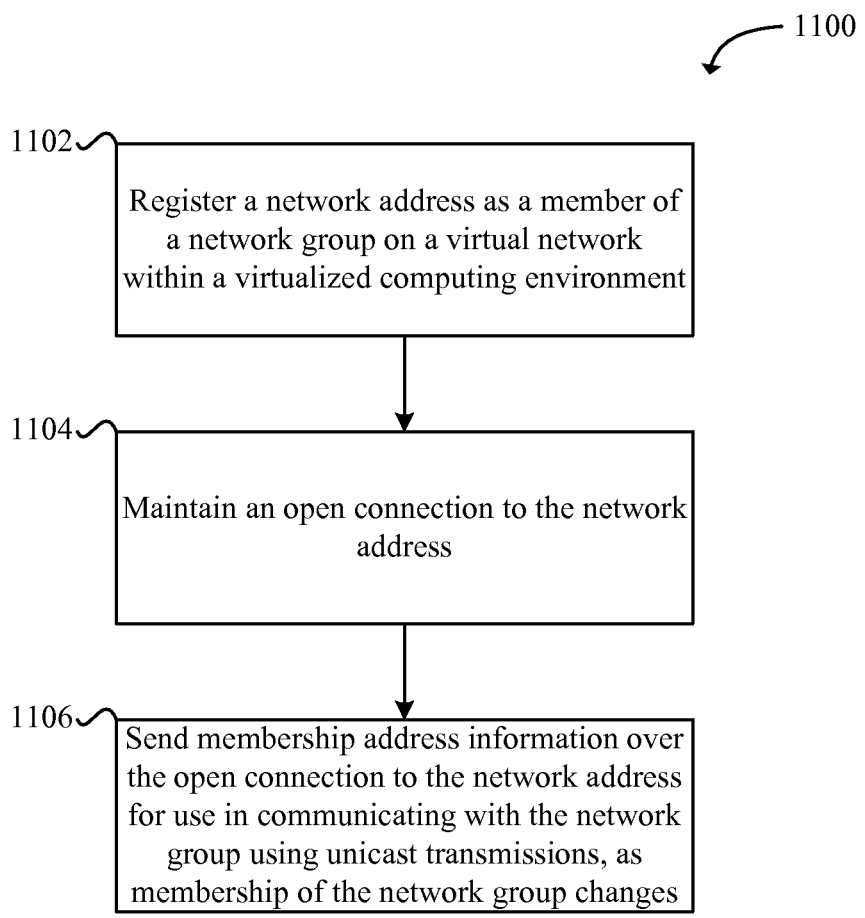
FIG. 11 is a flowchart illustrating an example method for managing a group in a network.

FIG. 11 is a flowchart illustrating an example method 1100 for managing a network group on a virtual network. The method 1100 may include registering a network address as a member of a network group on a virtual network within a virtualized computing environment, as shown in method element 1102, and maintaining an open connection to the network address, as shown in method element 1104. The virtualized computing environment may simplify administration of information technology (IT) infrastructure by allowing network group communication on a virtual network. The method may include sending membership address information over the open connection to the network address for use in communicating with the network group using unicast transmissions, as membership of the network group changes, as shown in method element 1106. More specifically, the same communications, messages, and/or packets may be sent over individual unicast transmission connections in order to enable each member of the network group to receive the same transmission contemporaneously. Thus, the technology may be used to create a multicast-like transmission mechanism. In particular, instances within the virtualized computing environment may be able to form network groups for specialized communication between members of a network group.

Figure 12:
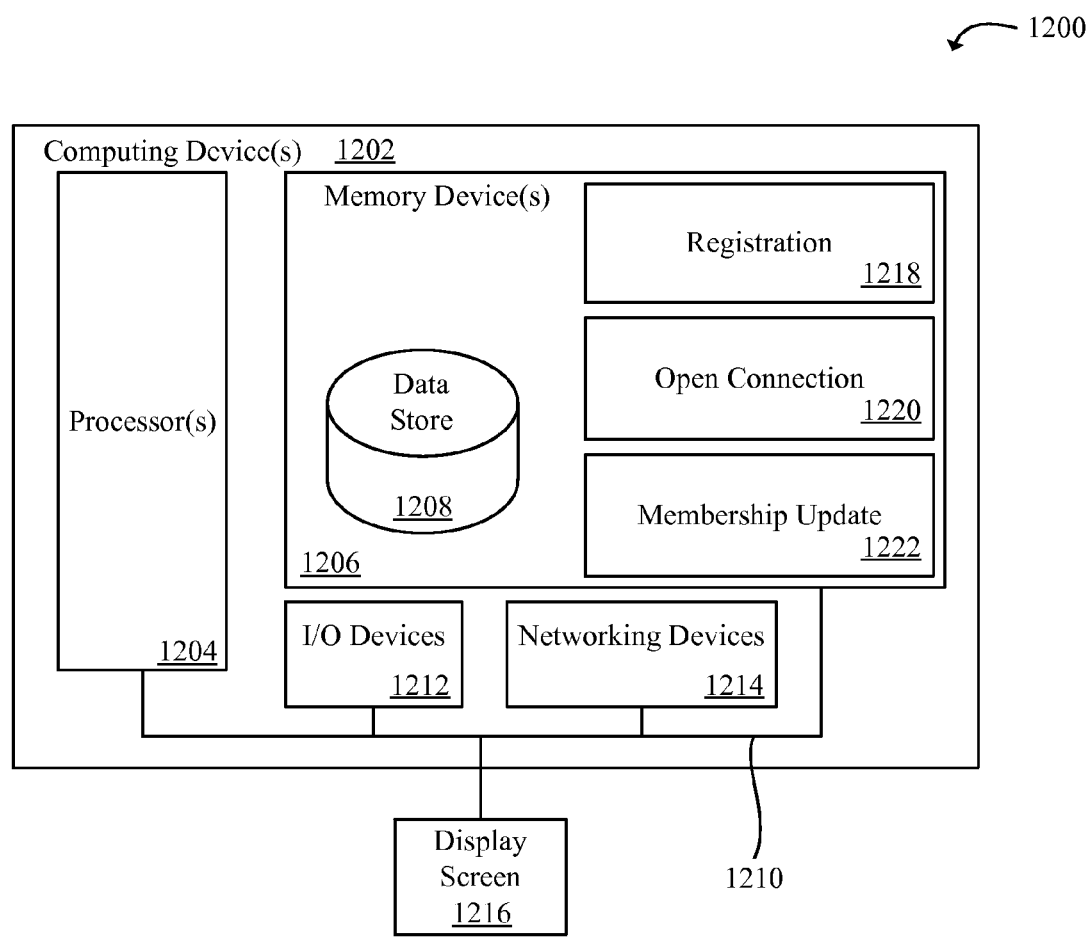
FIG. 12 is block diagram illustrating an example of a computing device that may be used for group networking in a virtual network.

FIG. 12 is block diagram illustrating an example of a computing device 1200 that may be used for group networking in a virtual network. In particular, the computing device 1202 illustrates a high level example of a device on which modules of the disclosed technology may be executed. The computing device 1202 may include one or more processors 1204 that are in communication with memory devices 1206. The computing device 1202 may include a local communication interface 1214 for the components in the computing device. For example, the local communication interface 1214 may be a local data bus and/or any related address or control busses as may be desired.

The memory device 1206 may contain modules that are executable by the processor(s) 1204 and data for the modules. Located in the memory device 1206 are modules executable by the processor. For example, a registration module 1218, an open connection module 1220, a membership update module 1222 and other modules may be located in the memory device 1206. For example, a membership information module and/or a group transmission module, as discussed above, may be further and/or alternatively may be located in the memory device 1206. The modules may execute the functions described earlier. For instance, the registration module 1218 may provide services for registering a network address as a member of a network group on a virtual network within a virtualized computing environment. The open connection module 1220 may provide services for maintaining an open connection to the network address. The membership update module 1222 may provide services for sending membership address information over the open connection to the network address for use in communicating with the network group using unicast transmissions.

A data store 1208 may also be located in the memory device 1206 for storing data related to the modules and other applications along with an operating system that is executable by the processor(s) 1204.

Other applications may also be stored in the memory device 1206 and may be executable by the processor(s) 1204. Components or modules discussed in this description that may be implemented in the form of software using high programming level languages that are compiled, interpreted or executed using a hybrid of the methods.

The computing device may also have access to I/O (input/output) devices 1210 that are usable by the computing devices. An example of an I/O device is a display screen 1216 that is available to display output from the computing devices. Other known I/O devices may be used with the computing device as desired. Networking devices 1212 and similar communication devices may be included in the computing device. The networking devices 1212 may be wired or wireless networking devices that connect to the internet, a LAN, WAN, or other computing network.

The components or modules that are shown as being stored in the memory device 1206 may be executed by the processor(s) 1204. The term "executable" may mean a program file that is in a form that may be executed by a processor 1204. For example, a program in a higher level language may be compiled into machine code in a format that may be loaded into a random access portion of the memory device 1206 and executed by the processor 1204, or source code may be loaded by another executable program and interpreted to generate instructions in a random access portion of the memory to be executed by a processor. The executable program may be stored in any portion or component of the memory device 1206. For example, the memory device 1206 may be random access memory (RAM), read only memory (ROM), flash memory, a solid state drive, memory card, a hard drive, optical disk, floppy disk, magnetic tape, or any other memory components.

The processor 1204 may represent multiple processors and the memory device 1206 may represent multiple memory units that operate in parallel to the processing circuits. This may provide parallel processing channels for the processes and data in the system. The local communication interface 1214 may be used as a network to facilitate communication between any of the multiple processors and multiple memories. The local communication interface 1214 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable medium storing a program causing a computer to perform a method for participating in a network group, comprising:
    under control of one or more computer systems configured with executable instructions:
        registering a virtualized computing instance as a member of a network group of virtualized computing instances, wherein the virtualized computing instance is configured to send unicast transmissions to members of the network group by directly addressing the unicast transmissions to the members of the network group, wherein a network address of the virtualized computing instance is registered with a network group manager, and wherein a server is configured with an instance manager that executes the virtualized computing instance and the virtualized computing instance is configured to execute an application;
        maintaining an open connection between the virtualized computing instance and the network group manager;
        receiving membership information for the network group intermittently over the open connection from the network group manager, the membership information including a plurality of network addresses of current members of the network group;
        maintaining the plurality of network addresses on the virtualized computing instance using the membership information received from the network group manager via the open connection; and
        sending the unicast transmissions from the virtualized computing instance to the plurality of network addresses of the current members of the network group, thereby creating a multicast transmission that is directly addressed to the current members of the network group.

2. The method of claim 1, wherein registering the virtualized computing instance as a member of the network group comprises sending a request to a programmatic interface of the network group manager.

3. The method of claim 1, further comprising deregistering the virtualized computing instance as a member of the network group by terminating the open connection to the network group manager.

4. The method of claim 1, further comprising submitting authentication material while registering the virtualized computing instance as a member of the network group.

5. A computer implemented method, comprising:
    under control of one or more computer systems configured with executable instructions:
        registering a network address for a virtualized computing instance as a member of a network group of virtualized computing instances, wherein the virtualized computing instance is configured to send unicast transmissions to members of the network group by directly addressing the unicast transmissions to the members of the network group, wherein a server is configured with an instance manager that executes the virtualized computing instance and the virtualized computing instance is configured to execute an application;
        maintaining an open connection to the network address for the virtualized computing instance; and
        sending membership address information over the open connection to the network address for the virtualized computing instance, wherein the membership address information is used by the virtualized computing instance to directly communicate with the network group using the unicast transmissions, as membership of the network group changes.

6. The method of claim 5, wherein maintaining the open connection comprises sending a keepalive transmission to the network address.

7. The method of claim 6, further comprising deregistering the network address as a member of the network group if the keepalive transmission indicates that the open connection has been terminated.

8. The method of claim 5, further comprising receiving authentication materials while registering the network address as a member of the network group.

9. The method of claim 5, further comprising:
    initiating a virtualized computing instance associated with the network address;
    assigning an identifier to the virtualized computing instance; and
    receiving notification that the virtualized computing instance with the identifier has access to the network group.

10. The method of claim 5, further comprising:
    initiating a virtualized computing instance associated with the network address; and
    providing authentication materials to the virtualized computing instance upon initiating the virtualized computing instance.

11. The method of claim 5, further comprising establishing a virtual private network connection with an external network to incorporate the external network into the virtual network to allow instances on the external network to join the network group.

12. A system for participating in a network group, comprising:
   at least one processor;
   a memory device including instructions that, when executed by the at least one processor, cause the system to:
   execute a virtual network within a virtualized computing environment using an Internet Protocol (IP);
   execute a plurality of virtualized computing instances on the virtual network, a subset of which are members of a network group, wherein a server is configured with an instance manager that executes the virtualized computing instance and the virtualized computing instance is configured to execute an application; and
   execute a network group manager for the virtual network to manage network group information and send current membership address information to members of the network group for use in communicating with the network group using unicast transmissions to create a multicast transmission, wherein the members of the network group receive the current membership address information from the network group manager via an open connection and send unicast transmissions directly addressed to current members of the network group, thereby creating the multicast transmission to the current members of the network group.

13. The system of claim 12, wherein the virtual network is a private virtualized network for a customer.

14. The system of claim 12, wherein the network group manager registers a network address as a member of the network group upon establishment of an open connection.

15. The system of claim 12, wherein the network group manager maintains an open transmission control protocol (TCP) connection with a network address that is a member of the network group by sending periodic keepalive transmissions to the network address.

16. The system of claim 12, wherein the network group manager deregisters a network address as a member of the network group if an open connection has been terminated.

17. The system of claim 12, wherein the network group manager validates a credential of a virtualized computing instance attempting to register as a member of the network group.

18. The system of claim 17, wherein the network group manager limits access to current membership information of the network group based in part on the credential and a network policy comprising a stored set of permissions associated with a set of credentials.

19. The system of claim 12, wherein the memory device includes instructions that, when executed by the processor, causes the system to further execute a launcher to initiate a virtualized computing instance, assign an identifier to the virtualized computing instance, and notify the network group manager that the virtualized computing instance with the identifier has access to the network group.

20. The system of claim 12, wherein the memory device includes instructions that, when executed by the processor, causes the system to further execute a launcher to initiate a virtualized computing instance and provide authentication materials to the virtualized computing instance upon initialization of the virtualized computing instance.

* * * * *